United States Patent
Lee et al.

(10) Patent No.: US 12,341,838 B2
(45) Date of Patent: Jun. 24, 2025

(54) ELECTRONIC DEVICE AND SINK DEVICE FOR TRANSMITTING AND RECEIVING AUDIO PACKET, AND OPERATING METHODS THEREOF

(71) Applicant: SAMSUNG ELECTRONICS CO., LTD., Suwon-si (KR)

(72) Inventors: Sanghoon Lee, Suwon-si (KR); Hyunwook Kim, Suwon-si (KR); Hangil Moon, Suwon-si (KR); Kyoungho Bang, Suwon-si (KR); Hyunchul Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/110,567

(22) Filed: Feb. 16, 2023

(65) Prior Publication Data
US 2023/0199051 A1    Jun. 22, 2023

Related U.S. Application Data

(63) Continuation of application No. PCT/KR2022/017764, filed on Nov. 11, 2022.

(30) Foreign Application Priority Data

Nov. 29, 2021  (KR) .................. 10-2021-0167073
Jan. 13, 2022  (KR) .................. 10-2022-0005387

(51) Int. Cl.
*H04L 65/752* (2022.01)
*H04L 65/75* (2022.01)
*H04L 65/80* (2022.01)

(52) U.S. Cl.
CPC .......... *H04L 65/752* (2022.05); *H04L 65/762* (2022.05); *H04L 65/80* (2013.01)

(58) Field of Classification Search
CPC ..... H04L 65/752; H04L 65/762; H04L 65/80; G10L 19/16; H04R 3/00; H04R 5/04
See application file for complete search history.

(56) References Cited

U.S. PATENT DOCUMENTS 9,204,203 B2 * 12/2015 Brockmann .......... H04N 19/164
9,553,913 B2    1/2017 Yang et al.
(Continued)

FOREIGN PATENT DOCUMENTS

JP    2007282185 A    10/2007
KR    1020180062230 A    6/2018
(Continued)

OTHER PUBLICATIONS

Communication issued on Sep. 9, 2024 by the European Patent Office for European Patent Application No. 22898913.3.

*Primary Examiner* — Oanh Duong
(74) *Attorney, Agent, or Firm* — Sughrue Mion, PLLC

(57) ABSTRACT

An electronic device includes a memory, a processor, and a communication interface configured to transmit audio packets to at least one sink device where the processor may determine bit rates of the audio packets based on at least one of a wireless transmission environment in which the audio packets are transmitted or a type of each of the audio packets, encode a broadcasting audio signal to the audio packets based on the bit rates of the audio packets, and repeatedly transmit the audio packets a predetermined number of times to the at least one sink device through a broadcasting channel.

18 Claims, 18 Drawing Sheets

(56) References Cited

U.S. PATENT DOCUMENTS

| | | | |
|---|---|---|---|
| 10,205,985 B2 | 2/2019 | Lue-Sang et al. | |
| 10,990,349 B2 | 4/2021 | Kumar et al. | |
| 2004/0064325 A1* | 4/2004 | Syed | G10L 19/167 |
| | | | 704/E19.048 |
| 2013/0244614 A1* | 9/2013 | Santamaria | H04W 12/069 |
| | | | 455/411 |
| 2016/0021674 A1 | 1/2016 | Lee | |
| 2017/0251469 A1* | 8/2017 | Lee | H04W 72/0446 |
| 2019/0102143 A1* | 4/2019 | Kumar | H04L 1/0007 |
| 2019/0200097 A1* | 6/2019 | Lee | H04N 21/6125 |
| 2020/0044769 A1* | 2/2020 | Neelisetty | H04W 4/80 |
| 2020/0075032 A1* | 3/2020 | Joseph | G10L 19/24 |
| 2020/0267200 A1 | 8/2020 | Baek et al. | |
| 2020/0304750 A1* | 9/2020 | Lynch | H04N 9/7921 |
| 2021/0120064 A1* | 4/2021 | Oesterreicher | H04N 21/2187 |
| 2021/0234913 A1 | 7/2021 | Hurst et al. | |
| 2023/0010512 A1* | 1/2023 | Sharma | H04L 1/0002 |
| 2024/0039977 A1* | 2/2024 | Tokunaga | H04L 1/1825 |

FOREIGN PATENT DOCUMENTS

| | | | | |
|---|---|---|---|---|
| KR | 1020200100387 A | 8/2020 | | |
| KR | 1020210020649 A | 2/2021 | | |
| KR | 1020210141295 A | 11/2021 | | |
| WO | WO-2022184485 A2 * | 9/2022 | | H04B 10/116 |
| WO | WO-2022240366 A1 * | 11/2022 | | |

* cited by examiner

ELECTRONIC DEVICE AND SINK DEVICE FOR TRANSMITTING AND RECEIVING AUDIO PACKET, AND OPERATING METHODS THEREOF

CROSS-REFERENCE TO RELATED APPLICATIONS

This application is a national stage application of International Application No. PCT/KR2022/017764, filed on Nov. 11, 2022, in the Korean Intellectual Property Receiving Office and claiming priority to Korean Patent Application No. 10-2021-0167073, filed on Nov. 29, 2021, and Korean Patent Application No. 10-2022-0005387, filed on Jan. 13, 2022, in the Korean Intellectual Property Office, the disclosures of which are incorporated by reference herein in their entireties.

BACKGROUND

1. Field

The disclosure relates to an electronic device for transmitting an audio packet and a sink device for receiving the audio packet, and operating methods thereof.

2. Description of Related Art

With the development of wireless communication technology, various types of wearable devices are being used together with smartphones. For example, a connection method of a headset used for listening to music or making a call is changing from a wired connection method to a method employing a wireless communication technology such as Bluetooth. For example, in low energy (LE) audio, which is being standardized by the Bluetooth special interest group (SIG), a broadcasting audio function may be added in addition to audio streaming supported by a Bluetooth headset, so that an electronic device (i.e., a source device) may provide a function of transmitting one or more audio streams to a plurality of sink devices. Broadcasting audio may provide users with a new experience by providing an audio sharing function that was not provided by Bluetooth. Through the audio sharing function, for example, a user can share the music played on a smartphone that the user is listening to with family and/or friends, or select and listen to content in various languages provided in places such as a movie theater or lecture hall.

SUMMARY

If wireless audio streaming or wireless audio broadcasting is performed, sound interruption may occur due to an influence of a wireless transmission environment, such as a change in a distance between devices or congestion of adjacent channels because of characteristics of a wireless transmission. For example, broadcasting audio may be more susceptible to sound interruption control due to a failure to receive an acknowledgment (ACK) indicating whether a packet is received from a sink device, unlike audio streaming.

An electronic device according to one embodiment includes a memory, a processor, and a communication interface configured to transmit audio packets to at least one sink device, the processor may be configured to determine bit rates of the audio packets based on at least one of a wireless transmission environment in which the audio packets are transmitted or a type of each of the audio packets, encode a broadcasting audio signal to the audio packets based on the bit rates, and repeatedly transmit the audio packets a predetermined number of times to the at least one sink device through a broadcasting channel.

The processor may be configured to allocate a bit rate of a plurality of different bit rates to an audio packet of the audio packets based on whether a type of the audio packet is a main packet, which is to be transmitted first among the repeatedly transmitted audio packets, or a retransmission packet, which is to be transmitted later than the main packet, among retransmission packets.

The processor may be configured to allocate a first bit rate of the plurality of different bit rates to the audio packet of the audio packets based on the audio packet being the main packet, and allocate a bit rate of the plurality of different bit rates less than the first bit rate to the audio packet of the audio packets based on the audio packet being the retransmission packet and an order of the retransmission packet among the retransmission packets.

The processor may be configured to variably adjust the bit rates of the audio packets based on a congestion level of the wireless transmission environment.

The communication interface may be configured to receive a request signal for requesting to change the bit rates of the audio packets from the at least one sink device, the request signal being based on a state of the wireless transmission environment determined by a reception position of an audio packet successfully received at the at least one sink device, and the processor may be configured to change the bit rates of the audio packets to a bit rate of a plurality of different bit rates corresponding to the request signal.

The processor may be configured to define the plurality of different bit rates for steps corresponding to the wireless transmission environment, allocate a bit rate of the plurality of different bit rates for a type of each of the repeatedly transmitted audio packets, and adjust the bit rates of the audio packets to a bit rate of the plurality of different bit rates less than the allocated bit rate in response to a request signal for requesting to change the bit rates being received from the at least one sink device through the communication interface, the request signal being based on a state of the wireless transmission environment determined by a reception position of an audio packet successfully received at the at least one sink device.

The processor may be configured to adjust the bit rates of the audio packets further based on at least one of a content characteristic of a broadcasting audio signal transmitted through the audio packets and a location in which a broadcasting service for the audio packets is provided.

The processor may be configured to analyze whether a characteristic of the broadcasting audio signal corresponds to a first characteristic that a sound quality is prioritized over an information transmission or a second characteristic that the information transmission is prioritized over the sound quality, and determine the bit rates of the audio packets to be a first bit rate of the plurality of different bit rates based on the characteristic of the broadcasting audio signal corresponding to the first characteristic, and determine the bit rates of the audio packets to be a second bit rate of the plurality of different bit rates less than the first bit rate based on the characteristic of the broadcasting audio signal corresponding to the second characteristic.

The processor may be configured to analyze location information of a device that provides a broadcasting service for the audio packets, and adjust the bit rates of the audio packets for each of steps of a predetermined wireless transmission environment in response to the location information.

A sink device according to an embodiment includes a memory, a processor, and a communication interface configured to receive audio packets from an electronic device, the audio packets being repeatedly transmitted a predetermined number of times by the electronic device through a broadcasting channel, and the processor may be configured to determine a bit rate of a plurality of different bit rates corresponding to a state of a wireless transmission environment in which the audio packets are transmitted based on a reception position of an audio packet being successfully received among the audio packets, generate a request signal for requesting to change bit rates of the audio packets to the determined bit rate, and transmit the request signal to the electronic device.

The processor may be configured to determine the bit rate to be a first bit rate of the plurality of different bit rates based on the successfully received audio packet being a main packet that is first transmitted among the audio packets, and determine the bit rate to be a bit rate of the plurality of different bit rates less than the first bit rate based on a reception position of a retransmission packet which is transmitted later than the main packet among the audio packets based on the successfully received audio packet being the retransmission packet.

The processor may be configured to transmit information on the determined bit rate together with the request signal to the electronic device.

The information on the determined bit rate may include a bit rate of the plurality of different bit rates corresponding to a state of the wireless transmission environment determined by a reception position of the successfully received audio packet among the audio packets.

The communication interface may be configured to generate a communication link for transmitting the request signal, and transmit the request signal to the electronic device through the communication link.

The processor may be configured to decode and output the audio packets.

A method of operating an electronic device according to an embodiment includes determining bit rates of audio packets based on at least one of a wireless transmission environment in which the audio packets are transmitted or a type of each of the audio packets, encoding a broadcasting audio signal to the audio packets based on the bit rates of the audio packets, and repeatedly transmitting the audio packets a predetermined number of times to at least one sink device through a broadcasting channel.

The determining of the bit rates may include allocating a bit rate of a plurality of different bit rates to an audio packet of the audio packets based on whether a type of the audio packet is a main packet, which is to be transmitted first among the repeatedly transmitted audio packets, or a retransmission packet, which is to be transmitted later than the main packet, among retransmission packets.

The method may further include receiving a request signal for requesting to change the bit rates of the audio packets from the at least one sink device, the request signal being based on a state of the wireless transmission environment determined by a reception position of an audio packet successfully received at the at least one sink device, and variably changing the bit rates of the audio packets to a bit rate of a plurality of different bit rates corresponding to the request signal.

A method of operating a sink device according to an embodiment includes receiving audio packets from an electronic device, the audio packets being repeatedly transmitted a predetermined number of times by the electronic device through a broadcasting channel, determining a bit rate of a plurality of different bit rates corresponding to a state of a wireless transmission environment in which the audio packets are transmitted based on a reception position of a successfully received audio packet among the audio packets, generating a request signal for requesting to change the bit rates of the audio packets to the determined bit rate, and transmitting the request signal to the electronic device.

According to an embodiment, there is provided a non-transitory computer-readable storage medium storing instructions that, when executed by a processor, cause the processor to perform the method of operating the electronic device.

BRIEF DESCRIPTION OF THE DRAWINGS

The above and other aspects, features, and advantages of certain embodiments of the present disclosure will be more apparent from the following detailed description, taken in conjunction with the accompanying drawings.

DETAILED DESCRIPTION

Figure 1:
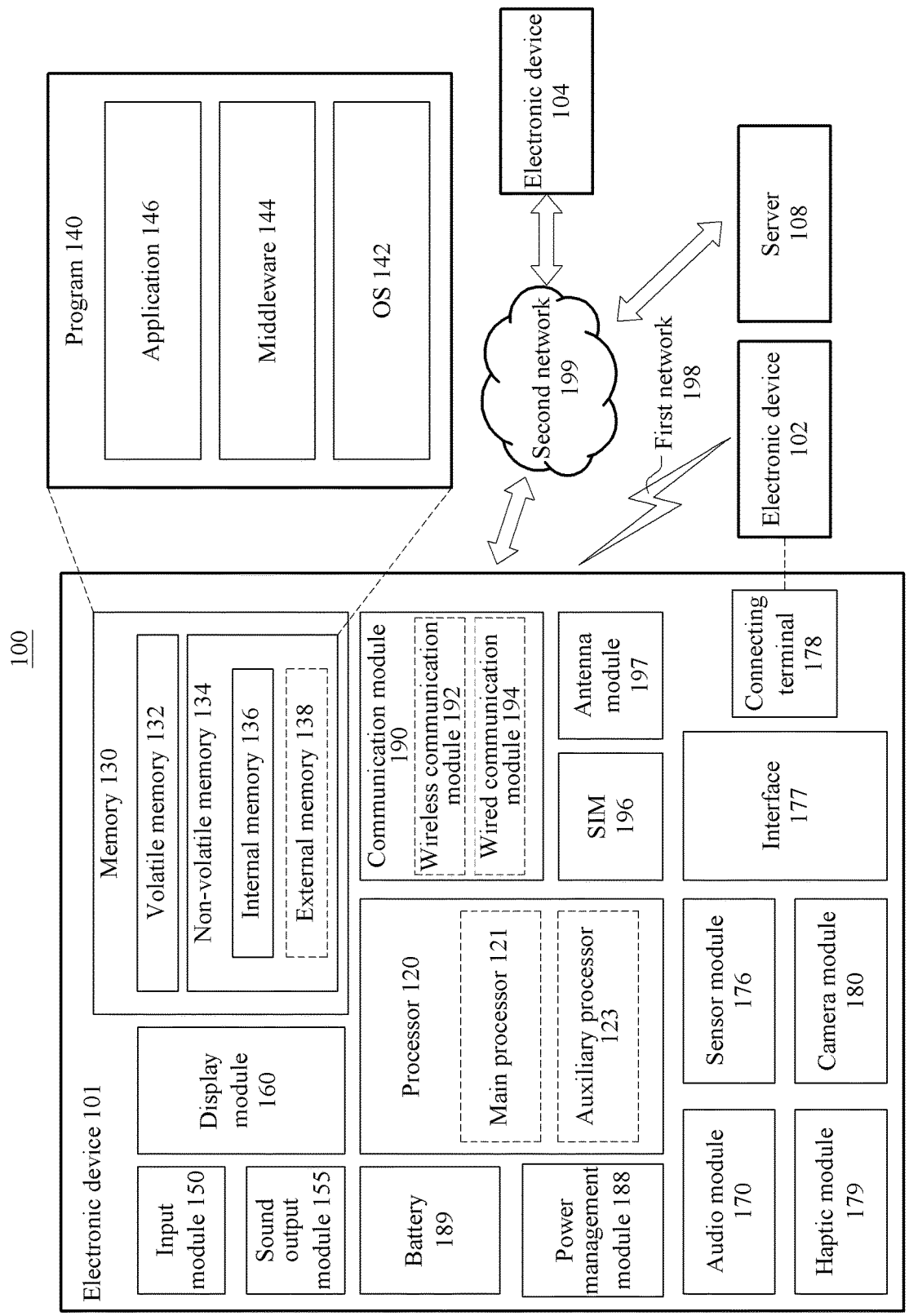
FIG. 1 is a block diagram illustrating an electronic device in a network environment according to an embodiment.

Hereinafter, embodiments will be described in detail with reference to the accompanying drawings. When describing the embodiments with reference to the accompanying drawings, like reference numerals refer to like elements and any repeated description related thereto will be omitted.

FIG. 1 is a block diagram illustrating an electronic device in a network environment according to an embodiment. Referring to FIG. 1, a first electronic device 101 in the network environment 100 may communicate with a second electronic device 102 via a first network 198 (e.g., a short-range wireless communication network), or communicate with at least one of an electronic device 104 or a server 108 via a second network 199 (e.g., a long-range wireless communication network). According to an embodiment, the first electronic device 101 may communicate with the electronic device 104 via the server 108. According to an embodiment, the first electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the first electronic device 101, or one or more other components may be added in the first electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the first electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the first electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the first electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated by machine learning. Such learning may be performed by, for example, the first electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the first electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the first electronic device 101, from the outside (e.g., a user) of the first electronic device 101. The input module 150 may include, for example, a microphone, a mouse, a keyboard, a key (e.g., a button), or a digital pen (e.g., a stylus pen).

The sound output module 155 may output a sound signal to the outside of the first electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the first electronic device 101. The display module 160 may include, for example, a control circuit for controlling a display, a hologram device, or a projector and control circuitry to control a corresponding one of the display, the hologram device, and the projector. According to an embodiment, the display device 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., the second electronic device 102 such as a speaker or headphones) directly or wirelessly connected to the first electronic device 101.

The sensor module 176 may detect an operational state (e.g., power or temperature) of the first electronic device 101 or an environmental state (e.g., a state of a user) external to the first electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, a Hall sensor, or an illuminance sensor.

The interface 177 may support one or more specified protocols to be used for the first electronic device 101 to be coupled with the external electronic device (e.g., the second electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the first electronic device 101 may be physically connected to an external electronic device (e.g., the second electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the first electronic device 101. According to an embodiment, the power management module 188 may be implemented as, for example, at least a part of a power management integrated circuit (PMIC).

The battery 189 may supply power to at least one component of the first electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the first electronic device 101 and the external electronic device (e.g., the second electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the first electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the first electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the first electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to embodiments, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the first electronic device 101 and the external electronic device 104 via the server 108 coupled with the second network 199. Each of the external electronic devices 102 and 104 may be a device of the same type as or a different type from the first electronic device 101. According to an embodiment, all or some of operations to be executed by the first electronic device 101 may be executed at one or more external electronic devices (e.g., the external devices 102 and 104, and the server 108). For example, if the first electronic device 101 needs to perform a function or a service automatically, or in response to a request from a user or another device, the first electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the first electronic device 101. The first electronic device 101 may provide the outcome, with or without further processing of the outcome, as at least part of a reply to the request. To that end, a cloud computing, distributed computing, mobile edge computing (MEC), or client-server computing technology may be used, for example. The first electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The first electronic device 101 may be applied to intelligent services (e.g., smart home, smart city, smart car, or healthcare) based on 5G communication technology or IoT-related technology.

Figure 2:
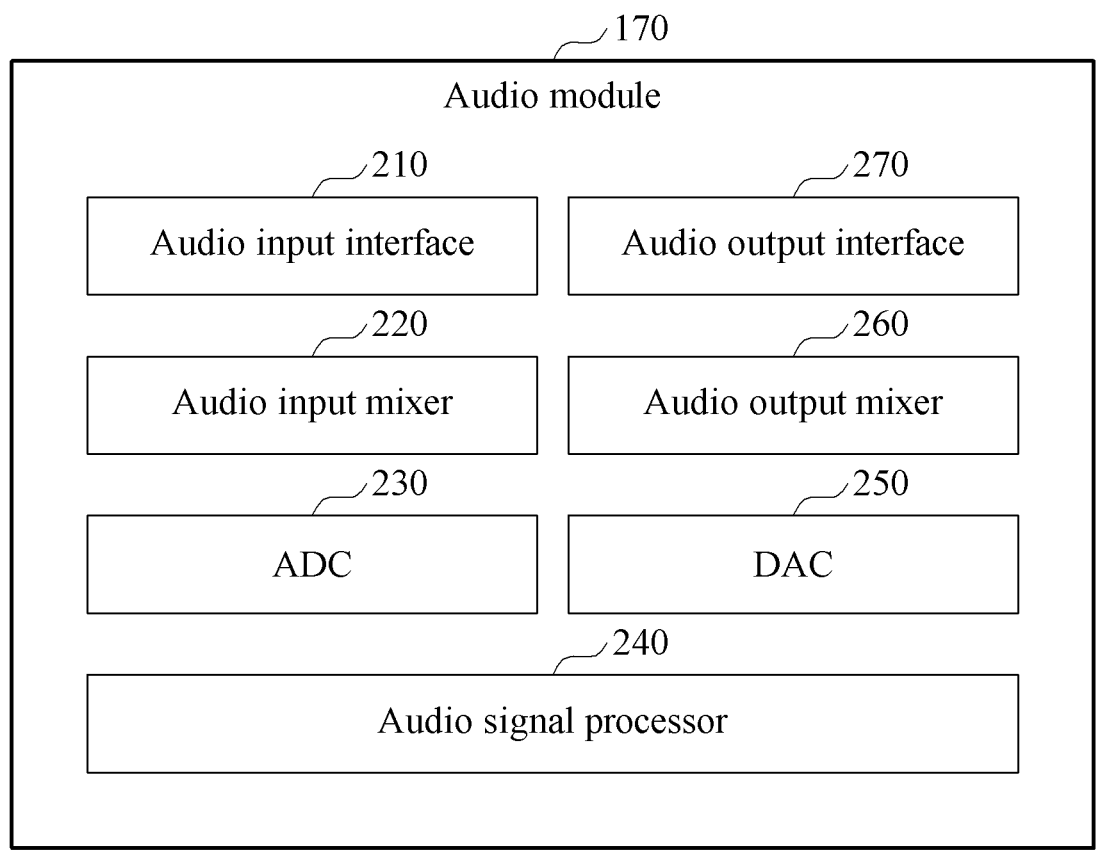
FIG. 2 is a block diagram of an audio module according to an embodiment.

FIG. 2 is a block diagram of an audio module 170 according to an embodiment.

Referring to FIG. 2, the audio module 170 may include an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the first electronic device 101 via a microphone (e.g., a dynamic microphone, a condenser microphone, or a piezo microphone) that is configured as part of the input module 150 or separately from the first electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the first electronic device 101.

The audio input mixer 220 may synthesize a plurality of input audio signals into at least one audio signal. For example, according to an embodiment, the audio input mixer 220 may synthesize a plurality of analog audio signals input via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the first electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor 120 or the memory 130) of the first electronic device 101 into an analog audio signal.

The audio output mixer 260 may synthesize a plurality of audio signals, which are to be output, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the first electronic device 101 via the sound output module 155. The sound output module 155 may include, for example, a speaker, such as a dynamic driver or a balanced armature driver, or a receiver. According to an embodiment, the sound output module 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal input via the audio input interface 210 or an audio signal that is to be output via the audio output interface 270. According to an embodiment, the audio amplifier may be configured as a module separate from the audio module 170.

The electronic device according to various embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those devices described above.

It should be appreciated that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one or two of A, B, or C," each of which may include any one of the items listed together in the corresponding one of the phrases, or all possible combinations thereof. Terms such as "1st" and "2nd," or "first" and "second" may be used to simply distinguish a corresponding component from other components, and do not limit the components in other aspects (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments of the present disclosure as set forth herein may be implemented as software (e.g., the program 140) including one or more instructions that are stored in a storage medium (e.g., an internal memory 136 or an external memory 138) that is readable by a machine (e.g., the first electronic device 101). For example, a processor (e.g., the processor 120) of the machine (e.g., the first electronic device 101) may invoke and execute at least one of the one or more instructions stored in the storage medium. This allows the machine to be operated to perform at least one function according to the at least one instruction invoked. The one or more instructions may include codes generated by a complier or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
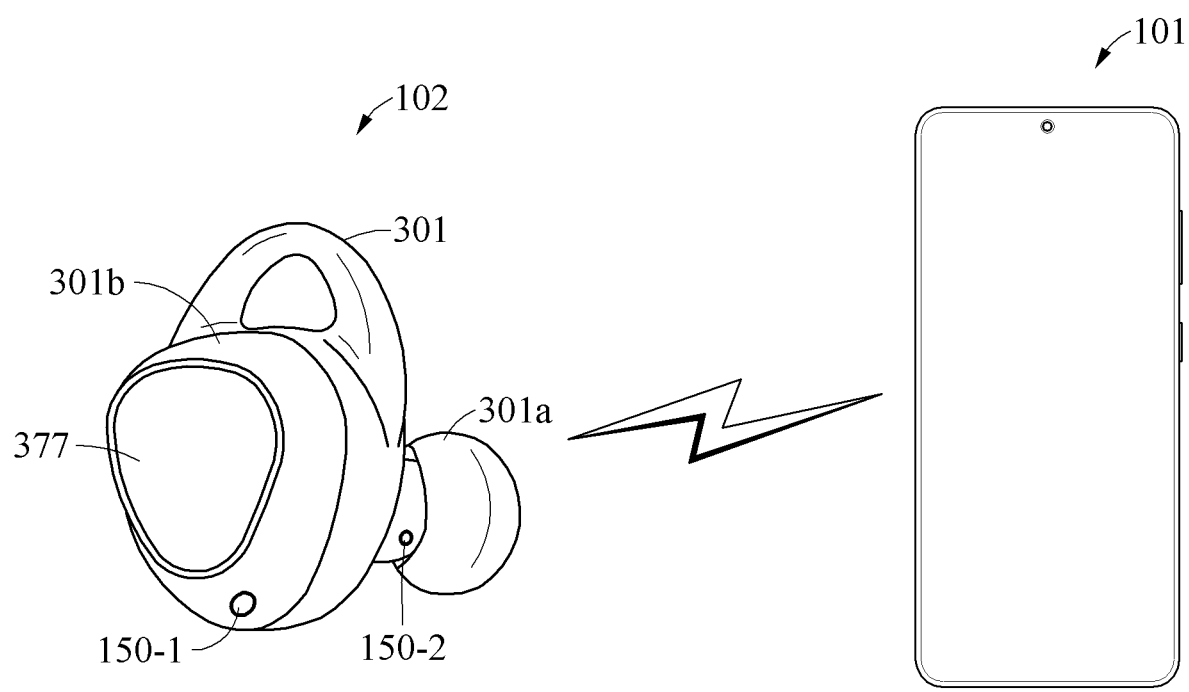
FIG. 3 is a diagram illustrating an example of an audio signal processing system according to an embodiment.

FIG. 3 is a diagram illustrating an example of an audio signal processing system according to an embodiment.

Referring to FIG. 3, an audio signal processing system according to an embodiment may include a first electronic device 101 and a second electronic device 102. The first electronic device 101 and/or the second electronic device 102 may include at least a portion of a configuration of the first electronic device 101 described above with reference to FIG. 1. In an example, the second electronic device 102 may be connected to the first electronic device 101 by wire or wirelessly, and may output an audio signal transmitted by the first electronic device 101. In another example, the second electronic device 102 may collect external sound signals using a plurality of microphones and transmit collected audio signals to the first electronic device 101.

According to an embodiment, the second electronic device 102 may include an input interface 377 configured to receive a user input. The input interface 377 may include, for example, a physical interface (e.g., a physical button, and a touch button) and a virtual interface (e.g., a gesture, object recognition, and voice recognition). In an embodiment, the second electronic device 102 may include a touch sensor configured to detect a contact with a skin of a user. For example, the touch sensor may be located on a partial area (e.g., the input interface 377) of the second electronic device 102. A user may apply an input by touching the partial area using a body part. Such a touch input may include, for example, a single touch, multiple touches, a swipe, and/or a flick.

According to an embodiment, the second electronic device 102 may be a wireless earphone that may establish a short-range communication channel (e.g., a Bluetooth module-based communication channel) with the first electronic device 101. The second electronic device 102 may be, for example, one of true wireless stereo (TWS) earphones, wireless headphones, and a wireless headset. Although the second electronic device 102 is illustrated in the form of a canal-type wireless earphone in FIG. 3, the embodiments are not limited thereto. For example, the second electronic device 102 may be a stem-type wireless earphone in which at least a portion of a housing protrudes in a predetermined direction to collect a good user voice signal. According to an embodiment, the second electronic device 102 may be a wired earphone connected to the first electronic device 101 in a wired manner.

According to an embodiment, the second electronic device 102 of the earphone type may include an insertion portion 301*a* that may be inserted into a user's ear, and a housing 301 or a case that is connected to the insertion portion 301*a* and that has a mounting portion 301*b* of which at least a portion may be mounted in a user's auricle. The second electronic device 102 may include a plurality of microphones 150-1 and 150-2.

The microphones 150-1 and 150-2 may perform a function of the input module 150 described above with reference to FIG. 1, and redundant description of the portion described above with reference to FIG. 1 will be omitted. Among the microphones 150-1 and 150-2, the first microphone 150-1 may be disposed on the mounting portion 301*b* such that at least a portion of a sound hole may be exposed to the outside of the ear, to collect external sounds, when the second electronic device 102 is worn on the user's ear. Among the microphones 150-1 and 150-2, the second microphone 150-2 may be positioned in the insertion portion 301*a*. The second microphone 150-2 may be positioned such that at least a portion of a sound hole may be exposed toward the inside of an external auditory canal (referred to as an external acoustic meatus) or may contact at least a portion of an inner wall of the external auditory canal, based on an opening toward an auricle of the external auditory canal, to collect a signal transferred to the inside of the external auditory canal, when the second electronic device 102 is worn on the user's ear. For example, if a user wears the second electronic device 102 and utters a speech, at least a portion of the sound from the speech may vibrate through the user's skin, muscles, bones, or the like, and such vibrations may be collected as sounds by the second microphone 150-2 inside an ear.

According to an embodiment, the second microphone 150-2 may include various types of microphones (e.g., in-ear microphones, inner microphones, or bone conduction microphones) capable of collecting sound from a cavity inside a user's ear. For example, the second microphone 150-2 may include at least one bone conduction microphone and/or at least one air conduction microphone for sensing a speech. The air conduction microphone may sense a speech (e.g., a user's utterance) transmitted through air and output a speech signal corresponding to the sensed speech. The bone conduction microphone may measure vibration of a bone (e.g., a skull) caused by a user's vocalization, and may output a speech signal corresponding to the measured vibration. The bone conduction microphone may be referred to as a "bone conduction sensor" or other various names. The speech sensed by the air conduction microphone may be a speech mixed with external noise while the user's utterance is transmitted through the air. Since the speech sensed by the bone conduction microphone is a speech sensed according to a vibration of a bone, the speech may be mixed with a small amount of external noise (e.g., an influence of noise).

Although one first microphone 150-1 and one second microphone 150-2 are mounted in the second electronic device 102 as shown in FIG. 3, the embodiments are not limited thereto. For example, a plurality of microphones 150-1 that are external microphones, and a plurality of second microphones 150-2 that are in-ear microphones may be mounted in the second electronic device 102. Although not shown in FIG. 3, the second electronic device 102 may further include an accelerator for voice activity detection (VAD) and a vibration sensor (e.g., a voice pickup unit (VPU) sensor).

According to an embodiment, the audio module 170 described above with reference to FIGS. 1 and 2 may be included in the second electronic device 102. Description of the audio module 170 provided above with reference to FIGS. 1 and 2 will be omitted. The second electronic device 102 may perform audio signal processing such as noise processing (e.g., noise suppressing), a frequency band control, and a gain control, through the audio module 170.

According to an embodiment, the second electronic device 102 may include a sensor configured to sense a state of being worn on a user's ear. For example, the sensor may include a sensor (e.g., an infrared sensor, or a laser sensor) configured to sense a distance to an object, and a sensor (e.g., a touch sensor) configured to sense a contact with an object. If the second electronic device 102 is worn on a user's ear, the sensor may generate a signal by sensing a distance to a skin or a contact with the skin. A processor of the second electronic device 102 may sense a signal generated by the sensor and recognize whether the second electronic device 102 is currently worn.

According to an embodiment, the first electronic device 101 may establish a communication channel with the second electronic device 102, and transmit a designated audio signal to the second electronic device 102 or receive an audio signal from the second electronic device 102. The first electronic device 101 may include, for example, various electronic devices, such as a mobile terminal, a terminal device, a smartphone, a tablet personal computer (PC), a pad, and a wearable electronic device, which are capable of establishing a communication channel (e.g., a wired or wireless communication channel) with the second electronic device 102. The first electronic device 101 may include a component identical to or corresponding to that of the first electronic device 101 described above with reference to FIG. 1, and may include fewer or more components than the first electronic device 101 of FIG. 1 depending on an implementation.

According to an embodiment, in the audio signal processing system, the second electronic device 102 may perform beamforming to obtain an enhanced user speech signal. For example, the second electronic device 102 may perform beamforming on external sound signals received through the plurality of microphones 150-1 and 150-2.

Figure 4:
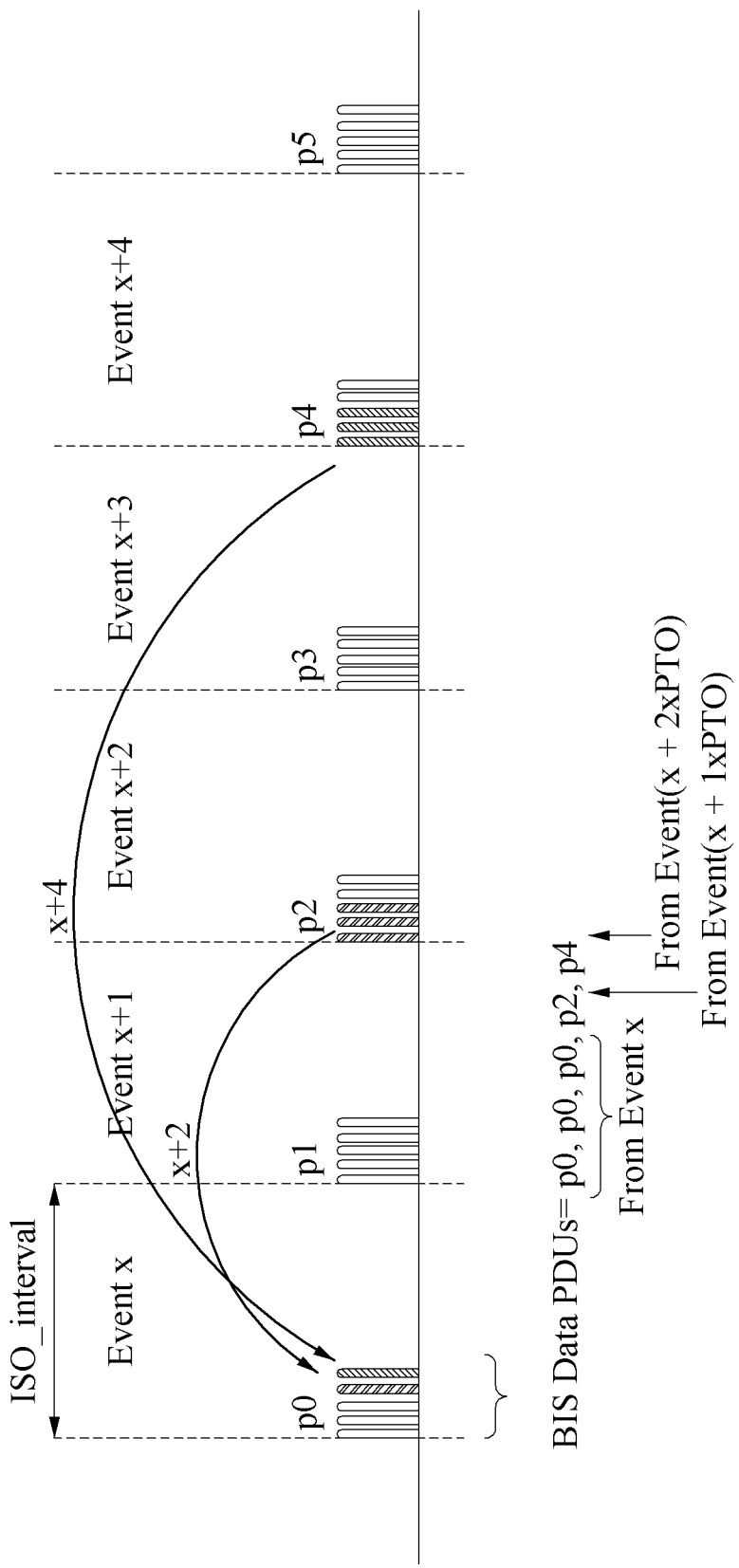
FIG. 4 is a diagram illustrating a method of transmitting a broadcasting audio packet in a low energy (LE) audio standard according to an embodiment.

FIG. 4 is a diagram illustrating a method of transmitting a broadcasting audio packet in a low energy (LE) audio standard according to an embodiment. FIG. 4 illustrates audio packets that are repeatedly retransmitted by an electronic device (e.g., the first electronic device 101 of FIG. 1, an electronic device 500 of FIG. 5, an electronic device 500 of FIG. 6, an electronic device 1601 of FIG. 16, an electronic device 1701 of FIG. 17, and/or an electronic device 1801 of FIG. 18) in LE audio standard broadcasting according to an embodiment.

Figure 7:
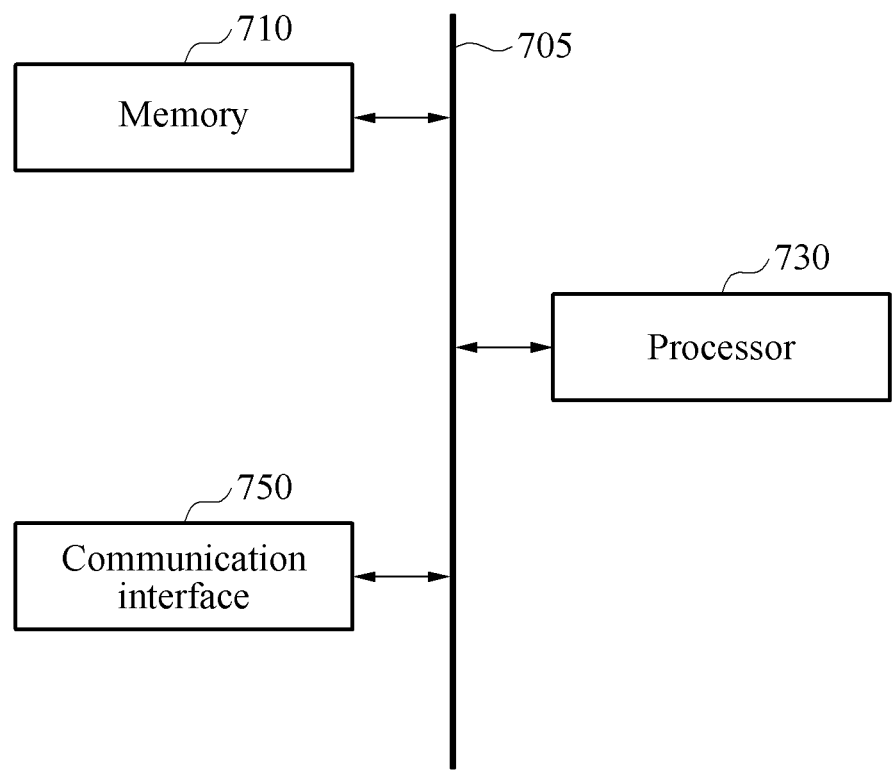
FIG. 7 is a block diagram illustrating an example of a sink device according to an embodiment.
Figure 8:
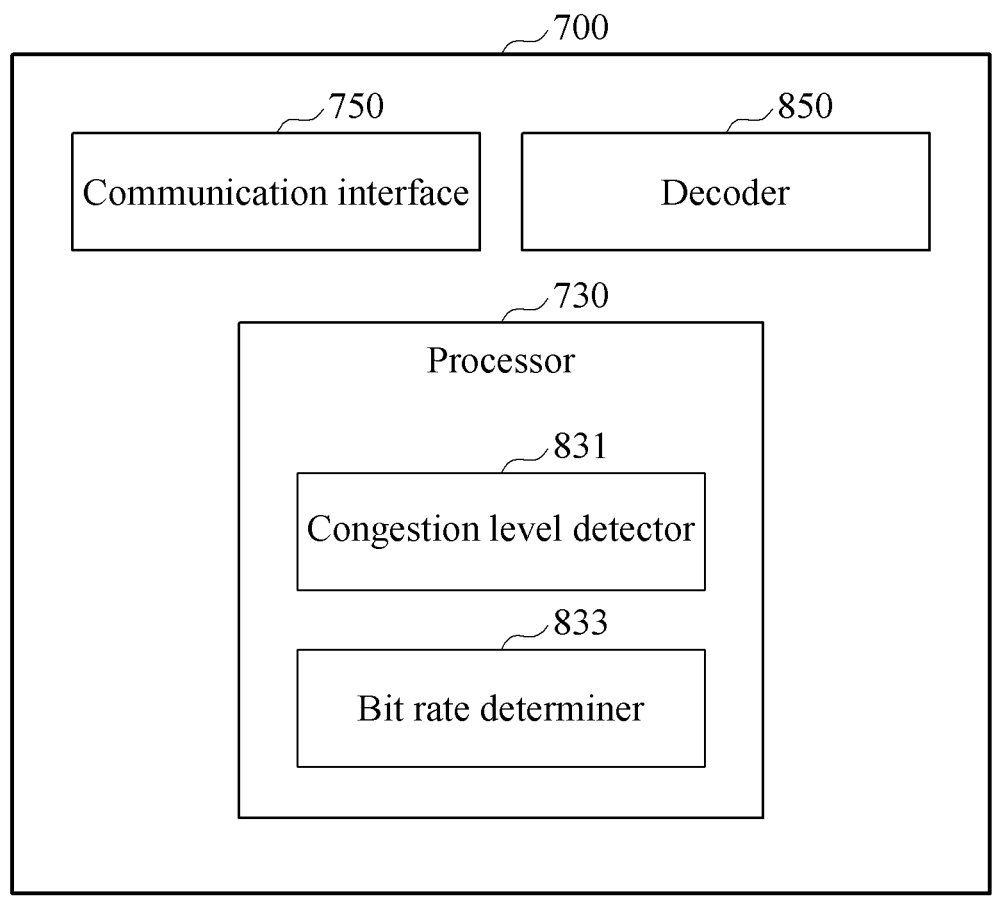
FIG. 8 is a block diagram illustrating another example of a sink device according to an embodiment.
Figure 16:
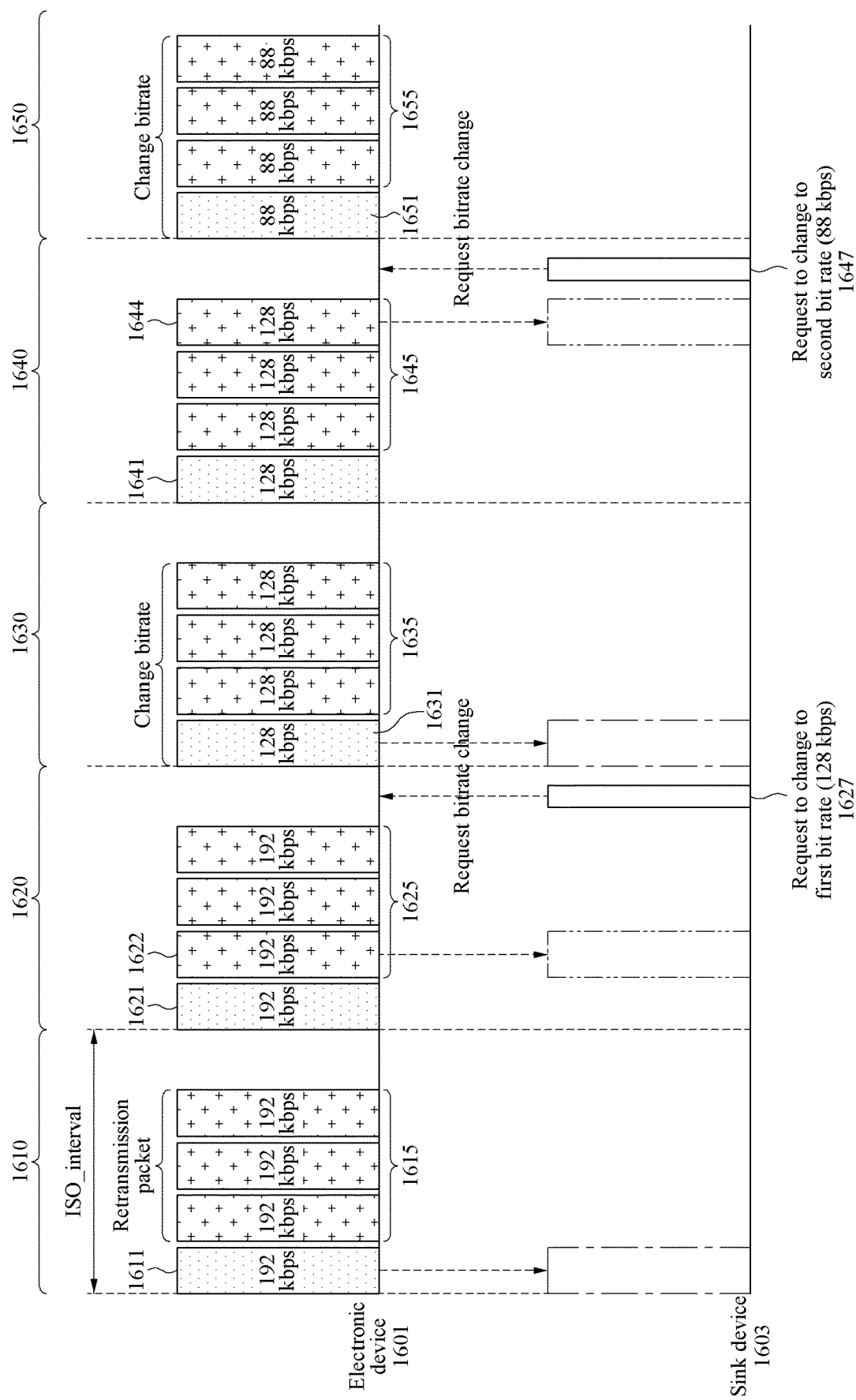
FIG. 16 is a diagram illustrating an example of a method of transmitting and receiving a packet between an electronic device and a sink device according to an embodiment.
Figure 17:
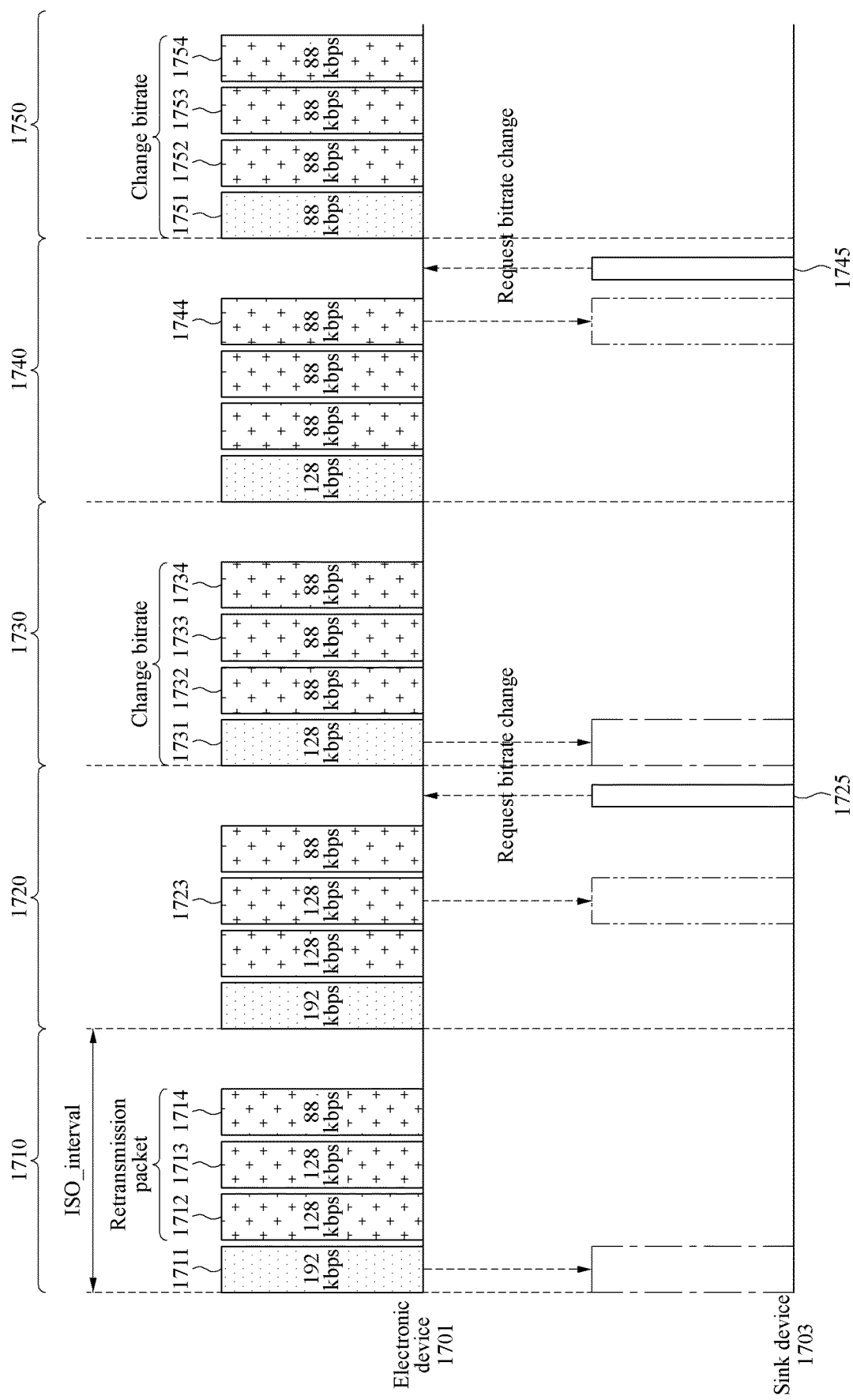
FIG. 17 is a diagram illustrating another example of a method of transmitting and receiving a packet between an electronic device and a sink device according to an embodiment.
Figure 18:
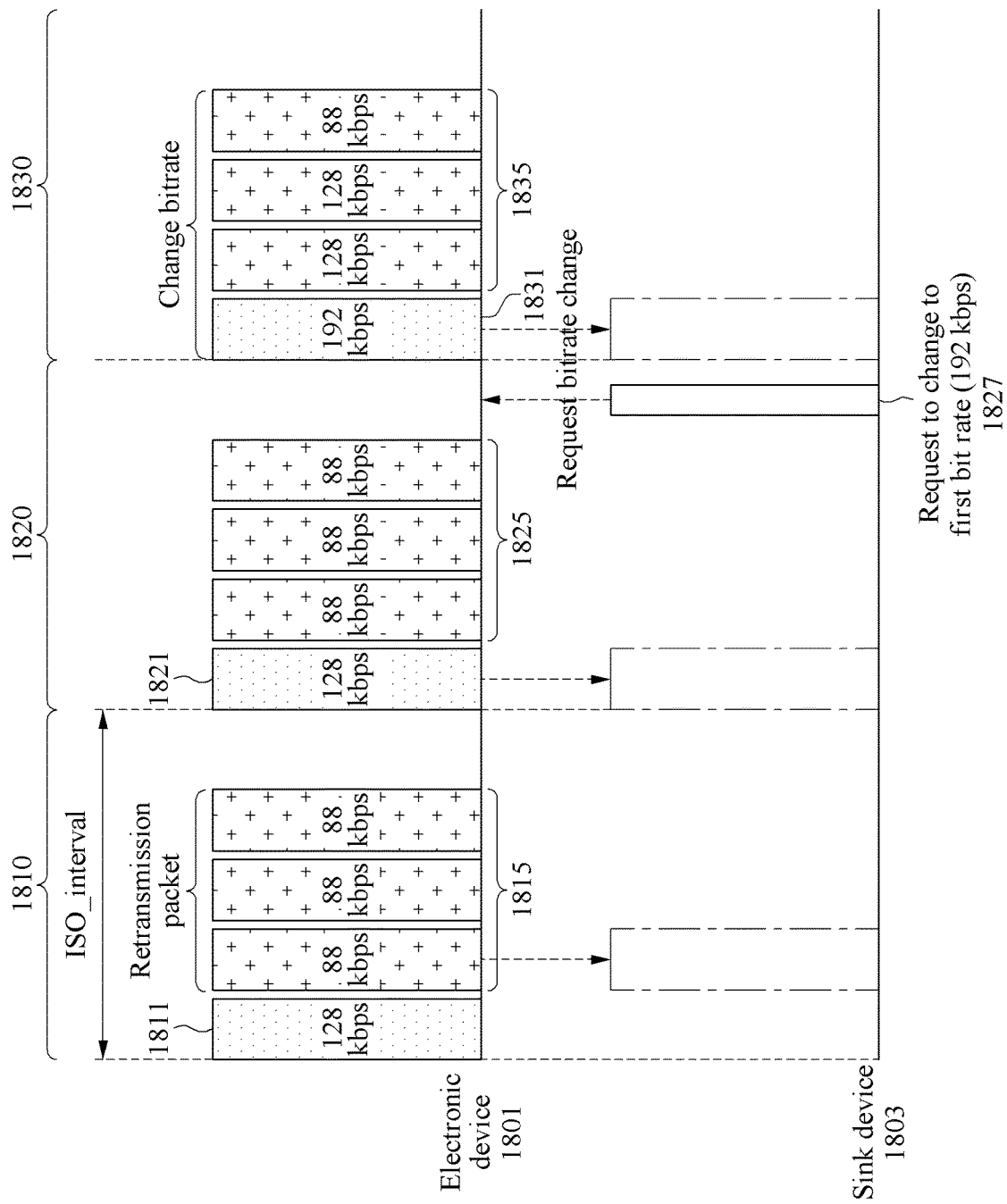
FIG. 18 is a diagram illustrating another example of a method of transmitting and receiving a packet between an electronic device and a sink device according to an embodiment.

Broadcasting audio using Bluetooth LE audio may broadcast audio packets to at least one sink device (e.g., the first electronic device 101 and the second electronic device 102 of FIG. 1, a sink device 700 of FIG. 7, a sink device 700 of FIG. 8, a sink device 1603 of FIG. 16, a sink device 1703 of FIG. 17, and/or a sink device 1803 of FIG. 18) that is not connected to the electronic device, without a separate connection process.

Since the broadcasting audio using Bluetooth LE audio supports a unidirectional transmission only, the electronic device may perform the unidirectional transmission. The electronic device may transmit audio packets to a plurality of unspecified sink devices. Due to a characteristic of the unidirectional transmission, it may be difficult for the electronic device to receive a response signal such as ACK or NACK from a sink device.

Accordingly, in the Bluetooth LE audio standard, a reliability of an audio transmission may be enhanced by retransmitting audio packets a predetermined number of times.

The electronic device may sequentially transmit audio packets such as p0, p1, p2, p3, p4, or p5, at regular transmission intervals (e.g., transmission intervals 1101 and 1103 of FIG. 11, transmission intervals 1610, 1620, 1630, 1640 and 1650 of FIG. 16, and/or transmission intervals 1710, 1720, 1730, 1740, and 1750 of FIG. 17) such as an ISO_interval that is a time interval based on the 8601 standard of the International Organization for Standardization (ISO). As described above, in the Bluetooth LE audio standard, audio packets may be retransmitted a predetermined number of times to ensure a transmission reliability. The number of retransmissions of the audio packets may be determined based on, for example, an immediate repetition count (IRC) value that is a count value indicating a number of repeated retransmissions, however, the embodiments are not limited thereto.

For example, in FIG. 4, when the IRC value is "3", the electronic device may retransmit the same packet three times at every transmission interval, a packet p0 may be transmitted three times in a first transmission interval, and a packet p1 may be transmitted three times in a second transmission interval.

In an embodiment, bit rates of multiple levels (e.g., a plurality of different bit rates) may be defined in advance for each of steps of a wireless transmission environment, and may be adjusted according to a type of each of packets (e.g., a main packet and a retransmission packet) and/or the wireless transmission environment, and the packets may be transmitted at the bit rates, so that a retransmission reliability may be enhanced.

In an embodiment, the electronic device may determine a state of the wireless transmission environment based on a position of a packet successfully received at a sink device among the same packets that are repeatedly transmitted at regular intervals, may set a bit rate, and/or may make a request to change the bit rate, to guarantee a transmission reliability of broadcasting audio data.

In addition, in an embodiment, when the wireless transmission environment deteriorates due to a change in a distance between devices or congestion of a neighboring channel, a bit rate of an audio packet to be transmitted may be changed before sound interruption occurs by lowering the bit rate based on whether the type of the audio packet is a main packet or a retransmission packet and based on an ordinal position or an order of the retransmission packet among retransmission packets. Thus, it is possible to reduce an occurrence of sound interruption and enhance a transmission reliability of the audio packet.

Figure 5:
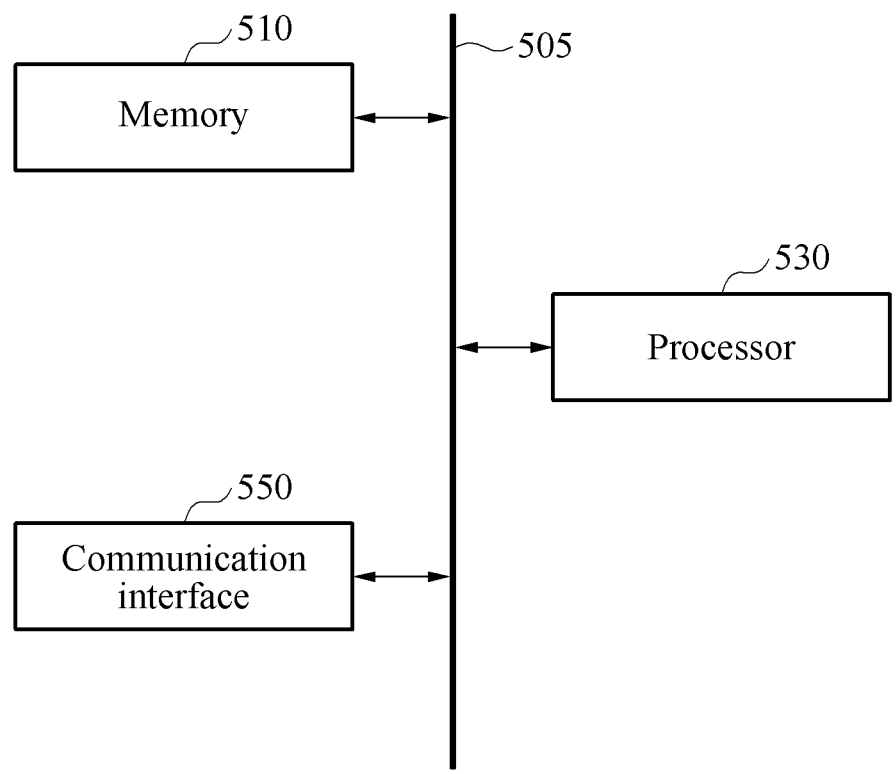
FIG. 5 is a block diagram illustrating an example of an electronic device according to an embodiment.

FIG. 5 is a block diagram illustrating an example of an electronic device according to an embodiment. Referring to FIG. 5, the electronic device 500 (e.g., the first electronic device 101 of FIG. 1, the electronic device 500 of FIG. 6, the electronic device 1601 of FIG. 16, the electronic device 1701 of FIG. 17, and/or the electronic device 1801 of FIG. 18) according to an embodiment may include a memory 510 (e.g., the memory 130 of FIG. 1), a processor 530 (e.g., the processor 120 of FIG. 1 and/or a processor 530 of FIG. 6), and a communication interface 550 (e.g., the communication module 190 of FIG. 1 and/or a communication interface 550 of FIG. 6). The memory 510, the processor 530, and the communication interface 550 may be connected to each other via a communication bus 505. The electronic device 500 may be, for example, an LE audio broadcasting device, but is not limited thereto.

The memory 510 may store a signal received through the communication interface 550, a bit rate determined by the processor 530, and/or audio packets encoded by the processor 530. The memory 510 may store a variety of information generated in a processing process of the processor 530 that will be described below. In addition, the memory 510 may store a variety of data and programs. The memory 510 may include, for example, a volatile memory (e.g., the volatile memory 132 of FIG. 1) or a non-volatile memory (e.g., the non-volatile memory 134 of FIG. 1). The memory 510 may include a high-capacity storage medium such as a hard disk to store a variety of data.

According to an embodiment, the processor 530 may determine bit rates of audio packets based on at least one of the type of each of the audio packets and a wireless transmission environment in which the audio packets are transmitted. The audio packets may be transmitted to at least one sink device (e.g., the first electronic device 101 and the second electronic device 102 of FIG. 1, the sink device 700 of FIG. 7, the sink device 700 of FIG. 8, the sink device 1603 of FIG. 16, the sink device 1703 of FIG. 17, and/or the sink device 1803 of FIG. 18) through the communication interface 550. A bit rate may correspond to the number of bits processed or transmitted per predetermined unit of time (e.g., in units of seconds (sec)), and may be represented by the number of bits per second (e.g., bit/sec, or bits per second (bps)). The bit rate may also be expressed as a "bit transmission rate."

According to an embodiment, the processor 530 may allocate a bit rate of a set level based on whether the type of an audio packet is a main packet (e.g., main packets 1110 and 1130 of FIG. 11, main packets 1611, 1621, 1631, 1641, and 1651 of FIG. 16, and main packets 1711, 1731, and 1751 of FIG. 17), which is to be transmitted first among audio packets that are repeatedly transmitted in a transmission interval, or a retransmission packet (e.g., retransmission packets 1117 and 1137 of FIG. 11, retransmission packets 1615, 1635, 1645, and 1655 of FIG. 16, and retransmission packets 1712, 1713, 1714, 1723, 1732, 1733, 1734, 1744, 1752, 1753, and 1754 of FIG. 17), which is to be transmitted later than the main packet. In an example, when the type of a corresponding audio packet is the main packet, the processor 530 may allocate a bit rate of a first level (e.g., a first bit rate) to the main packet. In another example, when the type of a corresponding audio packet is a retransmission packet, the processor 530 may allocate a bit rate of a level (e.g., a second bit rate) of a plurality of levels less than the first level, based on an ordinal position or an order of the retransmission packet among retransmission packets. The above scheme may be called a "pre-defined bit rate control scheme." A method by which the processor 530 adjusts a bit rate according to the type of an audio packet will be described in more detail with reference to FIGS. 10 and 11 below.

According to an embodiment, the processor 530 may variably adjust a bit rate of an audio packet based on a congestion level of the wireless transmission environment. The communication interface 550 may receive a request signal (e.g., request signals 1627 and 1647 of FIG. 16, and request signals 1725 and 1745 of FIG. 17) for requesting to change a bit rate from the at least one sink device 700. The request signal may be based on a state of the wireless transmission environment determined by a reception position of an audio packet successfully received by the at least one sink device 700. The processor 530 may change bit rates of the audio packets to a bit rate of a level corresponding to the request signal. The above scheme may be called a "congestion-based bit rate control scheme." A method by which the electronic device 500 adjusts a bit rate based on a wireless transmission environment will be described in more detail with reference to FIG. 12 below. In addition, an operation of transmitting and receiving an audio packet between the electronic device 500 and the sink device 700 based on a wireless transmission environment will be described in more detail with reference to FIG. 16 below.

According to an embodiment, the processor 530 may also set a bit rate based on both the type of an audio packet and the wireless transmission environment. The processor 530 may set bit rates of a plurality of levels for each of steps corresponding to the wireless transmission environment. For example, the processor 530 may allocate bit rates of different levels set for a type of each of repeatedly transmitted audio packets. In response to receiving a request signal for requesting to change a bit rate from at least one sink device 700 through the communication interface 550, the processor 530 may adjust the bit rates of the audio packets to a bit rate of a level less than the different levels of the allocated bit rates. An operation of determining bit rates based on both the type of an audio packet and the wireless transmission environment between the electronic device 500 and the sink device 700 according to an embodiment will be described in more detail with reference to FIG. 17 below.

According to an embodiment, the processor 530 may adjust a bit rate, further based on at least one of a content characteristic of a broadcasting audio signal transmitted through the audio packets and a location in which a broadcasting service for audio packets is provided. For example, the processor 530 may analyze whether a characteristic of the broadcasting audio signal corresponds to a first characteristic that a sound quality is prioritized over an information transmission or a second characteristic that the information transmission is prioritized over the sound quality. In an example, when the characteristic of the broadcasting audio signal corresponds to the first characteristic, based on a characteristic analysis result of the broadcasting audio signal, the processor 530 may determine the bit rates to be the bit rate of the first level. For example, when the sound quality is prioritized, the processor 530 may determine that a communication state is good, and increase the bit rate of the first level to transmit audio packets with a high sound quality.

In another example, when the characteristic of the broadcasting audio signal corresponds to the second characteristic, the processor 530 may determine the bit rates of the audio packets to be the bit rate of the second level less than the first level. For example, when the information transmission is prioritized, the processor 530 may determine that the communication state is poor, and lower a bit rate of an audio packet to the bit rate of the second level to increase reception rates of audio packets even though the sound quality is slightly reduced.

As described above, a scheme of determining a bit rate of an audio packet based on a characteristic of an audio signal may be called a "content-based bit rate control scheme."

According to an embodiment, the processor 530 may analyze location information of a device that provides the broadcasting service for the audio packets, and may adjust the bit rates for each of steps of a preset wireless transmission environment in response to the location information. As described above, a scheme of determining a bit rate based on a location of the device that provides the broadcasting service may be called a "location-based bit rate control scheme."

According to an embodiment, the processor 530 may also determine the bit rates of the audio packets based on both the content characteristic of the broadcasting audio signal and the location in which the broadcasting service for audio packets is provided, which will be described in more detail with reference to FIG. 13 below.

The processor 530 may encode the broadcasting audio signal to audio packets based on the bit rates determined through the above-described process. The term "encoding" used herein may indicate "coding", and the terms "encoding" and "coding" may be understood to have the same meaning.

The processor 530 may repeatedly transmit the audio packets a predetermined number of retransmissions (e.g., a predetermined number of times) to the at least one sink device 700 through a broadcasting channel. The processor 530 may sequentially transmit the audio packets according to, for example, a predetermined time interval or a predetermined transmission interval (e.g., ISO_interval).

The processor 530 may execute a program and control the electronic device 500. A code of the program executed by the processor 530 may be stored in the memory 510.

The communication interface 550 may transmit audio packets generated by the processor 530 to the at least one sink device 700. In addition, the communication interface 550 may receive a signal received from the outside of the electronic device 500 by the processor 530 or other data.

According to an embodiment, the processor 530 may perform at least one method that will be described below with reference to FIGS. 5 to 17 below or a scheme corresponding to the at least one method. The processor 530 may be a hardware-implemented electronic device having a physically structured circuit to execute desired operations. The desired operations may include, for example, codes or instructions included in a program. The hardware-implemented electronic device 500 may include, for example, a microprocessor, a CPU, a GPU, a processor core, a multi-core processor, a multiprocessor, an ASIC, a field-programmable gate array (FPGA), or an NPU.

Figure 6:
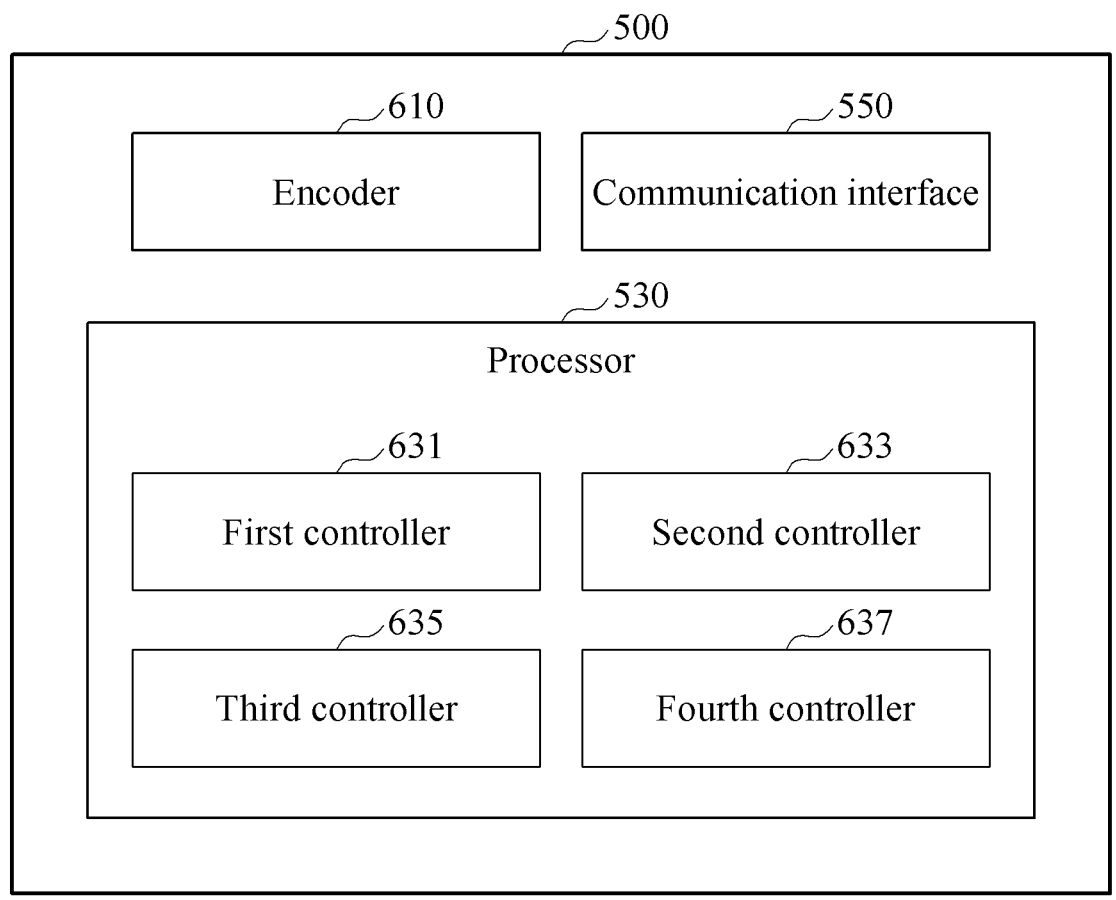
FIG. 6 is a block diagram illustrating another example of an electronic device according to an embodiment.

FIG. 6 is a block diagram illustrating another example of an electronic device according to an embodiment. Referring to FIG. 6, the electronic device 500 (e.g., the first electronic device 101 of FIG. 1, the electronic device 1601 of FIG. 16, the electronic device 1701 of FIG. 17, and/or the electronic device 1801 of FIG. 18) according to an embodiment may include an encoder 610, a processor 530 (e.g., the processor 120 of FIG. 1), and a communication interface 550 (e.g., the communication module 190 of FIG. 1). Although the encoder 610 is separated from the processor 530 as shown in FIG. 6 for convenience of description, the embodiments are not limited thereto. An operation of the encoder 610 may be performed by the processor 530.

The encoder 610 may encode an audio signal input to the electronic device 500. The audio signal encoded by the encoder 610 may be transferred to the communication interface 550, and may be transmitted to a sink device (e.g., the first electronic device 101 and the second electronic device 102 of FIG. 1, the sink device 700 of FIG. 7, the sink device 700 of FIG. 8, the sink device 1603 of FIG. 16, the sink device 1703 of FIG. 17, and/or the sink device 1803 of FIG. 18) through a packet conversion process for transmission. Here, an operating bit rate of the encoder 610, for example, a bit rate value used when the encoder 610 encodes an audio signal may be determined by the processor 530.

The processor 530 may determine a bit rate according to, for example, each of operating scenarios of the four schemes described above. The processor 530 may include controllers configured to determine bit rates for each of the four operating scenarios. The processor 530 may include, for example, at least one of a first controller 631, a second controller 633, a third controller 635, and a fourth controller 637, but the embodiments are not limited thereto.

According to an embodiment, the first controller 631 may determine a bit rate based on the type of an audio packet according to the above-described pre-defined bit rate control scheme. As described above with reference to FIG. 4, in LE audio broadcasting, audio packets may be transmitted at regular intervals (e.g., the transmission intervals 1101 and 1103 of FIG. 11, the transmission intervals 1610, 1620, 1630, 1640, and 1650 of FIG. 16, and/or the transmission intervals 1710, 1720, 1730, 1740, and 1750 of FIG. 17), and the same packet may be repeatedly transmitted multiple times to ensure a transmission reliability. A packet transmitted first among repeatedly transmitted audio packets may be referred to as a "main packet" (e.g., the main packets 1110 and 1130 of FIG. 11, the main packets 1611, 1621, 1631, 1641, and 1651 of FIG. 16, and the main packets 1711, 1731, 1751 of FIG. 17), and packet(s) repeatedly retransmitted later than the main packet may be referred to as "retransmission packet(s)" (e.g., the retransmission packets 1117 and 1137 of FIG. 11, the retransmission packets 1615, 1635, 1645, and 1655 of FIG. 16, the retransmission packets 1712, 1713, 1714, 1723, 1732, 1733, 1734, 1744, 1752, 1753, and 1754 of FIG. 17, and/or retransmission packets 1815, 1825, and 1835 of FIG. 18). For example, a number of retransmission packets to be retransmitted may be determined based on an IRC value.

For example, when the wireless transmission environment is not good, a probability that the sink device 700 receives a retransmission packet that is second or third transmitted may be greater than a probability that the sink device 700 receives the main packet that is first transmitted. Also, when the wireless transmission environment is not good, a probability that the sink device 700 receives a packet normally may increase as a data size of a retransmission packet decreases.

For example, the first controller 631 may set bit rates of a plurality of levels for steps of the wireless transmission environment, and may allocate different bit rates to the audio packets according to the types of the audio packets to be transmitted. The bit rates of the plurality of levels may include, for example, a bit rate (e.g., 192 kbps) of a first level, a bit rate (e.g., 128 kbps) of a second level, and a bit rate (e.g., 88 kbps) of a third level, but are not necessarily limited thereto.

In an embodiment, when the type of an audio packet is the main packet, for example, the first controller 630 may determine a bit rate of the audio packet to be the bit rate (e.g., 192 kbps) of the first level. When the type of the audio packet is a retransmission packet, the first controller 630 may determine a bit rate to be the bit rate (e.g., 128 kbps) of the second level. According to an embodiment, the first controller 630 may allocate a bit rate of the same level to the retransmission packets, or may also allocate bit rates of different levels according to a transmission order of retransmission packets. A method in which the first controller 630 allocates different bit rates according to the types of audio packets will be described in more detail with reference to FIGS. 10 and 11 below.

According to an embodiment, the second controller 633 may variably determine a bit rate based on a congestion level of the wireless transmission environment according to the above-described congestion-based bit rate control scheme. The second controller 633 may detect the congestion level of the wireless transmission environment and allocate a bit rate to an audio packet based on the detected congestion level. For example, when the congestion level is high, a low bit rate (e.g., the bit rate of the third level) may be allocated to an audio packet, and when the congestion level is low, a high bit rate (e.g., the bit rate of the first level) may be allocated to the audio packet. In this example, the congestion level of the wireless transmission environment may be detected directly by the electronic device 500, for example, a residual space of a transmission buffer of the electronic device 500 which transmits audio packets at regular intervals, and/or a received signal strength indication (RSSI) measured by the electronic device 500. Alternatively, the congestion level of the wireless transmission environment may also be detected by a congestion level of a wireless transmission environment determined by the sink device 700.

According to an embodiment, the sink device 700 may transmit a request signal for requesting to change a bit rate, together with information indicating the congestion level of the wireless transmission environment, to the electronic device 500. The information indicating the congestion level of the wireless transmission environment may include, for example, information indicating whether an audio packet successfully received by the sink device 700 is the main packet or a retransmission packet. The second controller 633 may detect the congestion level of the wireless transmission environment based on the information indicating the congestion level of the wireless transmission environment.

A signal for requesting to change a bit rate may be transmitted by the sink device 700 to the electronic device 500 through a communication channel separate from an existing data transmission channel.

According to an embodiment, the third controller 635 may determine a bit rate based on a characteristic of an audio signal or audio content according to the above-described content-based bit rate control scheme. In an example, when the audio signal corresponds to music sharing or music-based content such as television (TV) content, the third controller 635 may determine a high-level bit rate as a bit rate of each of the main packet and a retransmission packet, because a quality of the audio signal is important. In another example, when the audio signal is audio-based content, in which accurate content transmission is more important than a sound quality, for example, audio guidance and/or disaster broadcast, a fast transmission may be required rather than a quality of the audio signal, and accordingly the third controller 635 may determine a low-level bit rate as a bit rate of each of the main packet and a retransmission packet.

According to an embodiment, the fourth controller 637 may determine a bit rate based on a location in which a broadcasting service for audio packets is provided according to the above-described location-based bit rate control scheme. In an example, when a user of the electronic device 500 uses a broadcasting service in a house with a good wireless environment or outdoors in which a large number of wireless repeaters are installed, the fourth controller 637 may determine a high-level bit rate (e.g., the bit rate of the first level) as a bit rate of each of the main packet and retransmission packets. In another example, when the user of the electronic device 500 uses the broadcasting service in an area, for example, an airport, subway, or a market, where a wireless congestion level is high, and/or an area where a large number of wireless repeaters are not installed, the fourth controller 637 may determine a bit rate of a level less than the first level as a bit rate of each of the main packet and retransmission packets.

The communication interface 550 may be, for example, a Bluetooth communication interface, but is not limited thereto. The communication interface 550 may be commonly included in the electronic device 500 and the sink device 700. The communication interface 550 in the electronic device 500 may transmit audio packets to a plurality of sink devices 700 through, for example, a Bluetooth LE audio broadcasting channel.

FIG. 7 is a block diagram illustrating an example of a sink device according to an embodiment. Referring to FIG. 7, a sink device 700 (e.g., the first electronic device 101 and the second electronic device 102 of FIG. 1, the sink device 700 of FIG. 8, the sink device 1603 of FIG. 16, the sink device 1703 of FIG. 17, and/or the sink device 1803 of FIG. 18) according to an embodiment may include a memory 710 (e.g., the memory 130 of FIG. 1), a processor 730 (e.g., the processor 120 of FIG. 1, and/or a processor 730 of FIG. 8), and a communication interface 750 (e.g., the communication module 190 of FIG. 1, and/or a communication interface 750 of FIG. 8). The memory 710, the processor 730, and the communication interface 750 may be connected to each other via a communication bus 705.

The memory 710 may store audio packets received through the communication interface 750 and/or a request signal generated by the processor 730. Also, the memory 710 may store a variety of information generated in a processing process of the processor 730 that will be described below. In addition, the memory 710 may store a variety of data and programs. The memory 710 may include, for example, a volatile memory (e.g., the volatile memory 132 of FIG. 1) or a non-volatile memory (e.g., the non-volatile memory 134 of FIG. 1). The memory 710 may include a high-capacity storage medium such as a hard disk to store a variety of data.

The processor 730 may execute a program and control the sink device 700. A code of the program executed by the processor 730 may be stored in the memory 710.

According to an embodiment, the processor 730 may determine a bit rate of a level corresponding to a state of a wireless transmission environment in which an audio packet is transmitted, based on a reception position of a successfully received audio packet among audio packets. In an example, when the successfully received audio packet is a main packet that is first transmitted, the processor 730 may determine a bit rate to be a bit rate of a first level. In another example, when the successfully received audio packet is a retransmission packet that is transmitted later than the main packet, the processor 730 may determine a bit rate to be a bit rate of one of a plurality of levels less than the first level, based on a reception position of the retransmission packet.

In an example, when an audio packet successfully received at the sink device 700 is a first retransmission packet that is second transmitted later than the main packet, the processor 730 may determine a bit rate to be a bit rate of a second level less than the first level. In another example, when the successfully received audio packet is a second retransmission packet that is third transmitted, the processor 730 may determine the bit rate to be a bit rate of a third level less than the second level. In another example, when the successfully received audio packet is a third retransmission packet that is fourth transmitted, the processor 730 may determine the bit rate to be a bit rate of a fourth level less than the third level.

According to an embodiment, the processor 730 may generate a request signal for requesting to change bit rates of audio packets transmitted by the electronic device 500 to a bit rate determined by the sink device 700.

According to an embodiment, the processor 730 may transmit the generated request signal to the electronic device 500 through the communication interface 750. The processor 730 may transmit information on the determined bit rate, together with the request signal, to the electronic device 500. The information on the determined bit rate may include, for example, at least one of a bit rate of a level corresponding to a state of a wireless transmission environment determined by reception positions of audio packets, or a complexity of a wireless transmission environment in which the audio packets are transmitted.

The communication interface 750 may receive audio packets which are repeatedly transmitted a predetermined number of times, through a broadcasting channel from the electronic device 500. The communication interface 750 may generate a communication link for transmitting a request signal and transmit the request signal to the electronic device 500 via the communication link.

In addition, the processor 730 may perform at least one method that will be described with reference to FIGS. 7 to 17 below or a scheme corresponding to the at least one method. The processor 730 may be a hardware-implemented electronic device having a physically structured circuit to execute desired operations. The desired operations may include, for example, codes or instructions included in a program. The hardware-implemented sink device 700 may include, for example, a microprocessor, a CPU, a GPU, a processor core, a multi-core processor, a multiprocessor, an ASIC, an FPGA, or an NPU.

FIG. 8 is a block diagram illustrating another example of a sink device according to an embodiment. Referring to FIG. 8, a sink device 700 (e.g., the first electronic device 101 and the second electronic device 102 of FIG. 1, the sink device 1603 of FIG. 16, the sink device 1703 of FIG. 17, and/or the sink device 1803 of FIG. 18) according to an embodiment may include a communication interface 750 (e.g., the communication module 190 of FIG. 1), a processor 730 (e.g., the processor 120 of FIG. 1), and a decoder 850.

According to an embodiment, the communication interface 750 may generate a separate communication link to transmit a request signal (e.g., request signals 1627 and 1647 of FIG. 16, request signals 1725 and 1745 of FIG. 17, and/or a request signal 1827 of FIG. 18) for requesting to change a bit rate from the sink device 700 to an electronic device (e.g., the first electronic device 101 of FIG. 1, the electronic device 500 of FIG. 5, the electronic device 500 of FIG. 6, the electronic device 1601 of FIG. 16, the electronic device 1701 of FIG. 17, and/or the electronic device 1801 of FIG. 18), in addition to a communication link for transmitting data and/or a control signal. The communication interface 750 may transmit the request signal 1627, 1647 for requesting to change a bit rate to the electronic device 500 through the separate communication link. The request signal 1627, 1647 may include a change level of a bit rate.

The processor 730 may include, for example, a congestion level detector 831 and a bit rate determiner 833.

The congestion level detector 831 may detect a congestion level of a wireless transmission environment. In an LE audio broadcasting environment, the electronic device 500 may transmit one main packet 1110, 1130 and a plurality of retransmission packets 1117 and 1137 together at regular transmission intervals. If the main packet 1110, 1130 transmitted first among audio packets transmitted by the electronic device 500 is received normally at the sink device 700, the sink device 700 may determine that the wireless transmission environment is good. If the sink device 700 fails to receive the main packet 1110, 1130 and receives one of the retransmission packets 1117 and 1137, the sink device 700 may determine that the wireless transmission environment is poor.

For example, retransmission packets transmitted by the electronic device 500 may be defined as a first retransmission packet, a second retransmission packet, a third retransmission packet, or an N-th retransmission packet in an order that the retransmission packets are transmitted.

According to an embodiment, the congestion level detector 831 may determine that the wireless transmission environment is poor when the third retransmission packet is successfully received by the sink device 700, in comparison to when the first retransmission packet among the retransmission packets 1117 and 1137 is successfully received.

According to an embodiment, the congestion level detector 831 may transmit information on a reception position of an audio packet to the bit rate determiner 833. The information on the reception position of the audio packet may indicate how many times the sink device 700 receives an audio packet normally.

According to an embodiment, the bit rate determiner 833 may determine a bit rate based on the information on the reception position of the audio packet received from the congestion level detector 831, and may transmit the request signal 1627, 1647 for requesting to change a bit rate of an audio packet to be transmitted by the electronic device 500 to the bit rate determined by the rate determiner 833 to the electronic device 500 through a communication channel.

According to an embodiment, the decoder 850 may be located in the sink device 700, may decode audio packets received from the electronic device 500 and may output the audio packets. Also, an operation of the decoder 850 may be performed by the processor 730.

Figure 9:
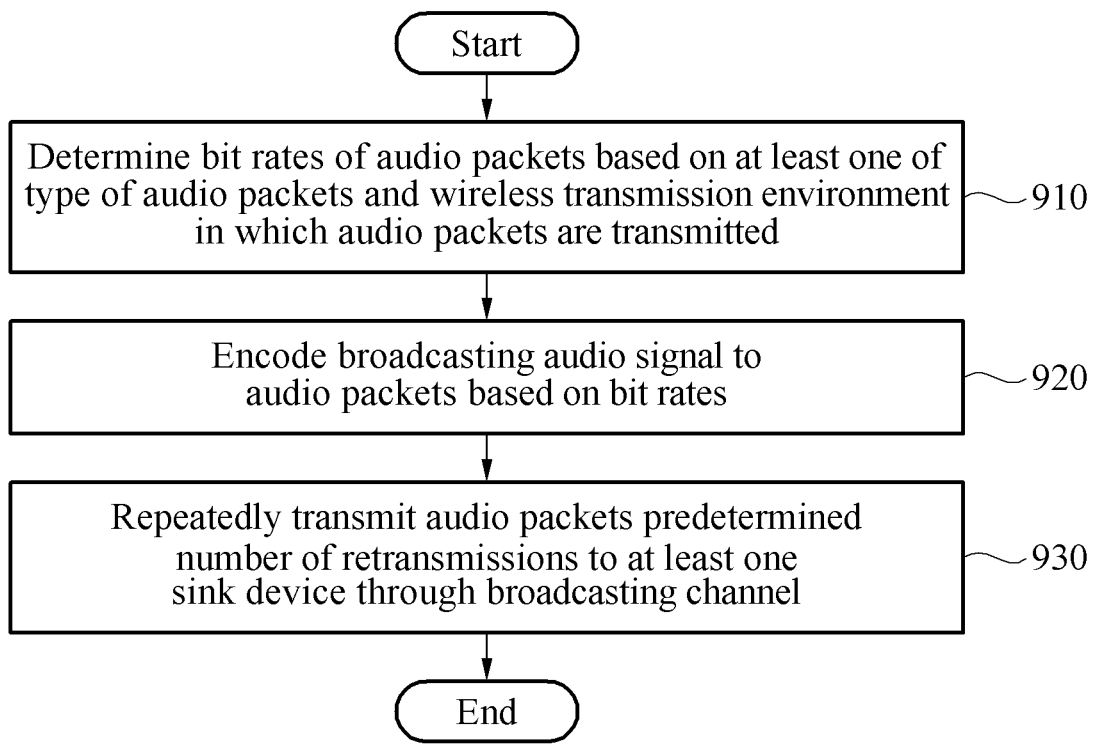
FIG. 9 is a flowchart illustrating an example of a method of operating an electronic device according to an embodiment.

FIG. 9 is a flowchart illustrating an example of a method of operating an electronic device according to an embodiment. In the following embodiments, operations may be performed sequentially, but are not necessarily performed sequentially. For example, the order of the operations may be changed and at least two of the operations may be performed in parallel.

An electronic device (e.g., the first electronic device 101 of FIG. 1, the electronic device 500 of FIG. 5, the electronic device 500 of FIG. 6, the electronic device 1601 of FIG. 16, the electronic device 1701 of FIG. 17 and/or the electronic device 1801 of FIG. 18) according to an embodiment may transmit audio packets to a sink device (e.g., the first electronic device 101 and the second electronic device 102 of FIG. 1, the sink device 700 of FIG. 7, the sink device 700 of FIG. 8, the sink device 1603 of FIG. 16, the sink device 1703 of FIG. 17, and/or the sink device 1803 of FIG. 18) through operations 910 to 930.

In operation 910, the electronic device 500 may determine bit rates of the audio packets based on at least one of types of the audio packets to be transmitted to at least one sink device 700 and a wireless transmission environment in which the audio packets are transmitted. In an example, the electronic device 500 may allocate a bit rate of a set level to an audio packet based on whether the type of the audio packet is a main packet (e.g., the main packet 1110 of FIG. 11, the main packet 1611 of FIG. 16, the main packet 1711 of 17, and/or main packets 1811, 1821, and 1831 of FIG. 18), which is to be transmitted first among the audio packets, or a retransmission packet (e.g., the retransmission packets 1117 and 1137 of FIG. 11, the retransmission packets 1615, 1635, 1645, and 1655 of FIG. 16, the retransmission packets 1712, 1713, 1714, 1723, 1732, 1733, 1734, 1744, 1752, 1753, and 1754 of FIG. 17, and/or the retransmission packets 1815, 1825, and 1835 of FIG. 18), which is to be retransmitted later than the main packet, and based on an ordinal position or an order of the retransmission packet among retransmission packets in a retransmission interval.

In operation 920, the electronic device 500 may encode a broadcasting audio signal to the audio packets based on the bit rates determined in operation 910.

In operation 930, the electronic device 500 may repeatedly transmit a predetermined number of retransmissions (e.g., a predetermined number of times) the audio packets encoded in operation 920 to the at least one sink device 700 through a broadcasting channel.

In another example, the electronic device 500 may receive the request signal 1627, 1647 for requesting to change the bit rates of audio packets from the at least one sink device 700. In this example, the request signal 1627, 1647 may be based on a state of the wireless transmission environment determined by a reception position of an audio packet successfully received by the at least one sink device 700. The electronic device 500 may variably change the bit rates of the audio packets to a bit rate of a level corresponding to the request signal 1627, 1647.

Figure 10:
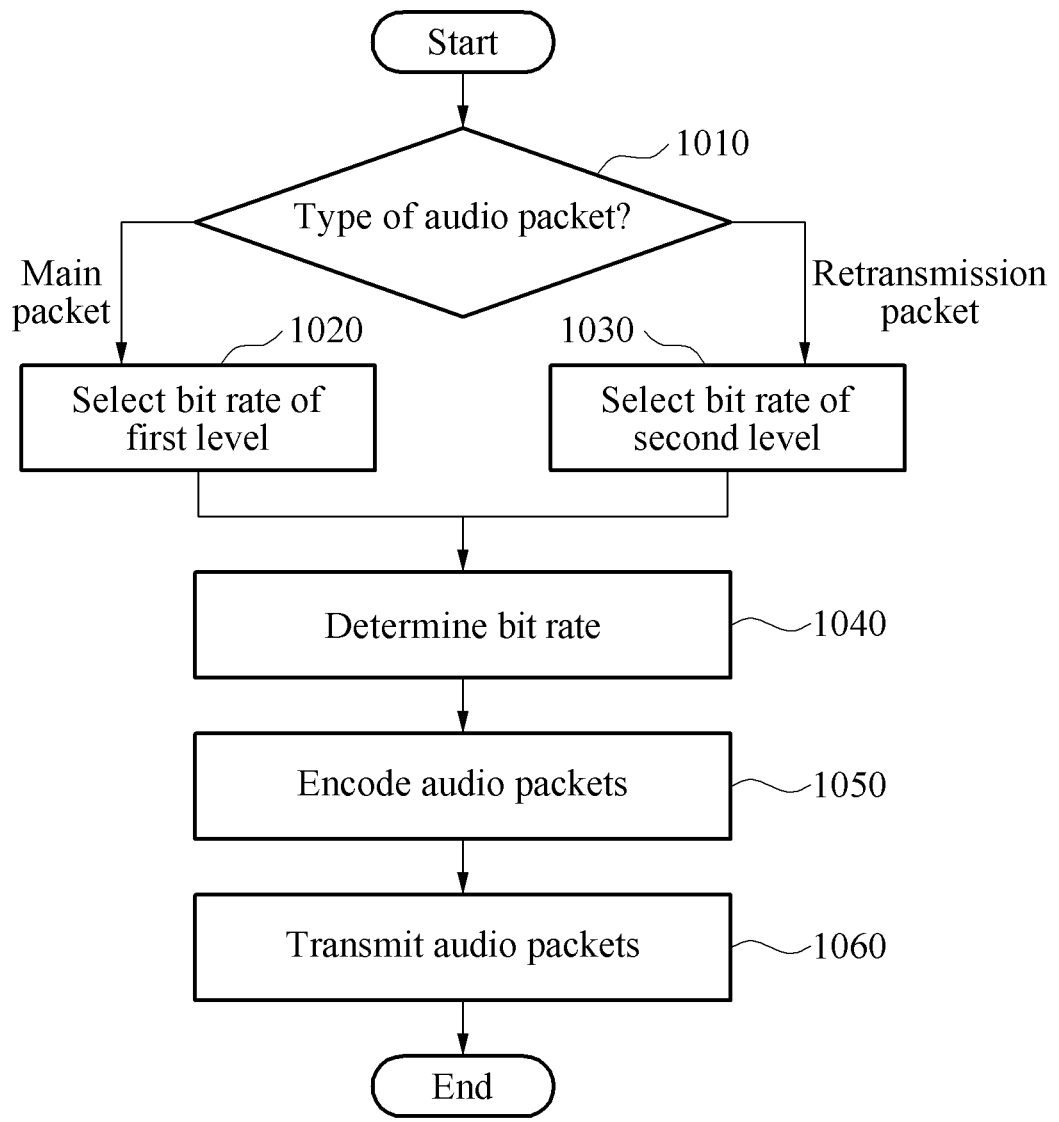
FIG. 10 is a flowchart illustrating a method by which an electronic device determines a bit rate based on a type of packets, according to an embodiment.

FIG. 10 is a flowchart illustrating a method by which an electronic device determines a bit rate based on a type of each of audio packets, according to an embodiment. In the following embodiments, operations may be performed sequentially, but are not necessarily performed sequentially. For example, the order of the operations may be changed and at least two of the operations may be performed in parallel.

Referring to FIG. 10, an electronic device (e.g., the first electronic device 101 of FIG. 1, the electronic device 500 of FIG. 5, the electronic device 500 of FIG. 6, the electronic device 1601 of FIG. 16, the electronic device 1701 of FIG. 17 and/or the electronic device 1801 of FIG. 18) according to an embodiment may adjust a bit rate of an audio signal and transmit audio packets to at least one sink device (e.g., the first electronic device 101 and the second electronic device 102 of FIG. 1, the sink device 700 of FIG. 7, the sink device 700 of FIG. 8, the sink device 1603 of FIG. 16, the sink device 1703 of FIG. 17, and/or the sink device 1803 of FIG. 18), through operations 1010 to 1060.

In operation 1010, the electronic device 500 may identify a type of an audio packet of audio packets to be transmitted to the sink device 700.

In an example, when the type of the audio packet identified in operation 1010 is a main packet (e.g., the main packets 1110 and 1130 of FIG. 11, the main packets 1611, 1621, 1631, 1641, and 1651 of FIG. 16, the main packets 1711, 1731, and 1751 of FIG. 17, and/or the main packets 1811, 1821, and 1831 of FIG. 18), the electronic device 500 may select a bit rate of a first level as a bit rate at which the main packets 1110 and 1130 are to be transmitted, in operation 1020.

In another example, when the type of the audio packet identified in operation 1010 is a retransmission packet (e.g., the retransmission packets 1117 and 1137 of FIG. 11, the retransmission packets 1615, 1635, 1645, and 1655 of FIG. 16, the retransmission packets 1712, 1713, 1714, 1723, 1732, 1733, 1734, 1744, 1752, 1753, and 1754 of FIG. 17, and/or the retransmission packets 1815, 1825, and 1835 of FIG. 18), the electronic device 500 may select a bit rate of a second level as a bit rate at which the retransmission packets 1117 and 1137 are to be transmitted, in operation 1030.

In operation 1040, the electronic device 500 may determine the bit rate selected in operation 1020 or 1030 as a bit rate at which a corresponding audio packet is to be transmitted, according to the type of each of the audio packets to be transmitted.

In operation 1050, the electronic device 500 may encode audio packets based on the bit rates determined in operation 1040.

In operation 1060, the electronic device 500 may transmit the audio packets encoded in operation 1050 to the at least one sink device 700.

As described above, in an LE audio broadcasting environment, audio packets may be transmitted at regular transmission intervals, and the same packets may be repeatedly transmitted multiple times to ensure a transmission reliability.

In an embodiment, bit rates of various levels (e.g., a plurality of different bit rates) may be set in advance for each of steps of the wireless transmission environment, and different bit rates may be allocated to the main packets 1110 and 1130 and the retransmission packets 1117 and 1137, respectively, to enhance a retransmission reliability.

Figure 11:
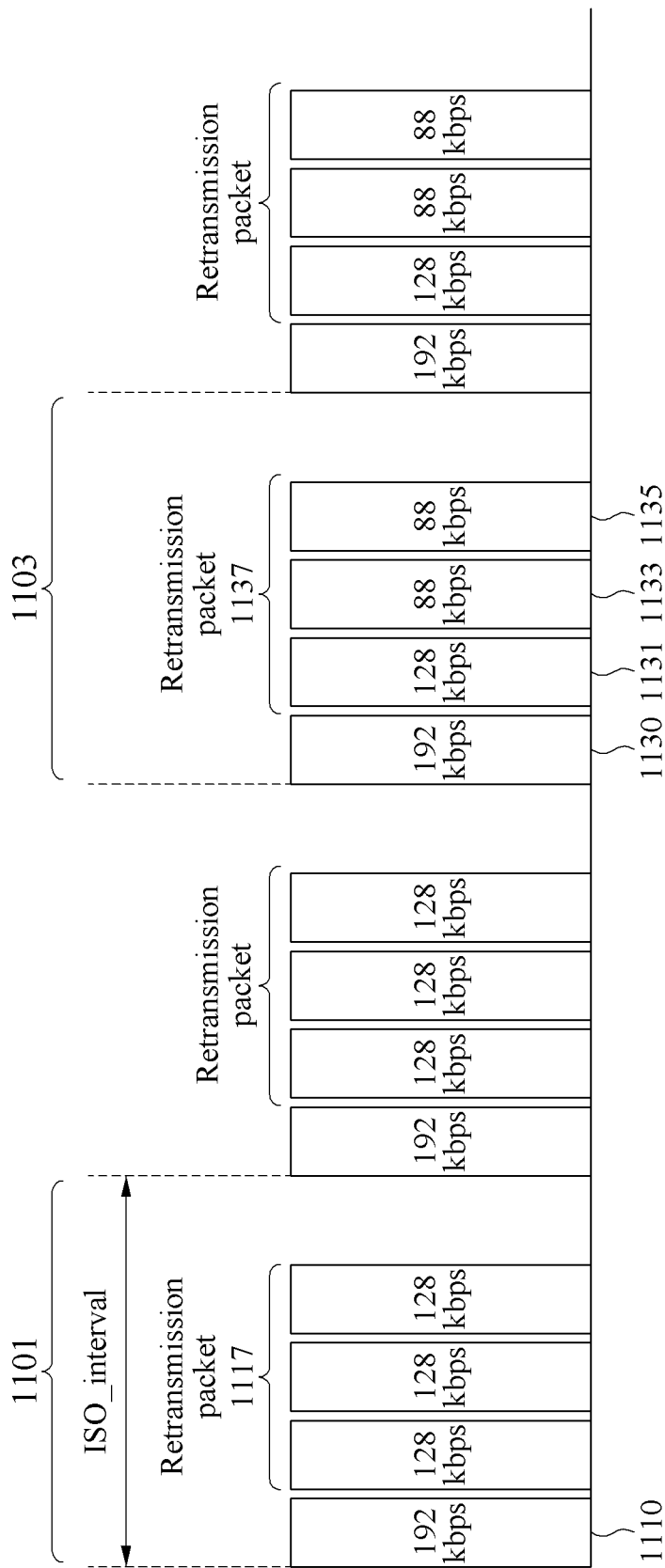
FIG. 11 is a diagram illustrating a method by which an electronic device adjusts a bit rate based on a type of packets, according to an embodiment.

FIG. 11 is a diagram illustrating a method by which an electronic device adjusts a bit rate based on a type of each of audio packets, according to an embodiment. In an example of FIG. 11, an electronic device (e.g., the first electronic device 101 of FIG. 1, the electronic device 500 of FIG. 5, the electronic device 500 of FIG. 6, the electronic device 1601 of FIG. 16, the electronic device 1701 of FIG. 17, and/or the electronic device 1801 of FIG. 18) according to an embodiment may sequentially transmit audio packets to at least one sink device (e.g., the first electronic device 101 and the second electronic device 102 of FIG. 1, the sink device 700 of FIG. 7, the sink device 700 of FIG. 8, the sink device 1603 of FIG. 16, the sink device 1703 of FIG. 17, and/or the sink device 1803 of FIG. 18) at regular transmission intervals 1101 and 1103 (e.g., the transmission intervals 1610, 1620, 1630, 1640, and 1650 of FIG. 16, the transmission intervals 1710, 1720, 1730, 1740, and 1750 of FIG. 17, and/or the transmission intervals 1810, 1820, and 1830 of FIG. 18).

In an example, when a wireless transmission environment is good, the sink device 700 may receive the main packet 1110 (e.g., the main packets 1611, 1621, 1631, 1641, and 1651 of FIG. 16, the main packets 1711, 1731, and 1751 of FIG. 17, and/or the main packets 1811, 1821, and 1831 of FIG. 18) that is transmitted first among a plurality of audio packets that are transmitted by the electronic device 500. In another example, when the wireless transmission environment is poor, the sink device 700 may receive one of the retransmission packets 1117 (e.g., the retransmission packets 1615, 1635, 1645, and 1655 of FIG. 16, the retransmission packets 1712, 1713, 1714, 1723, 1732, 1733, 1734, 1744, 1752, 1753, and 1754 of FIG. 17, and/or the retransmission packets 1815, 1825, and 1835 of FIG. 18) that are transmitted later than the main packet 1110.

For example, the electronic device 500 may set bit rates of a plurality of levels. For example, the electronic device 500 may set 192 kbps as a bit rate of a first level, set 128 kbps as a bit rate of a second level, and set 88 kbps as a bit rate of a third level.

The electronic device 500 may set the bit rate (e.g., 192 kbps) of the first level, which is the highest bit rate, as a bit rate at which the main packet 1110 among audio packets to be transmitted to the sink device 700 is to be transmitted in the first transmission interval 1101. The electronic device 500 may set the bit rate (e.g., 128 kbps) of the second level less than the first level, for the retransmission packets 1117 that are to be transmitted later than the main packet 1110 in the first transmission interval 1101.

In an embodiment, the sink device 700 may determine that the wireless transmission environment deteriorates when the sink device 700 does not receive the main packet and receives a retransmission packet that is transmitted later among a plurality of retransmission packets 1117. In an embodiment, the electronic device 500 may lower a bit rate of a retransmission packet to be transmitted later among the retransmission packets 1117 and transmit the retransmission packet at the lowered bit rate, thereby increasing a packet reception rate of the sink device 700 and a transmission reliability of audio packets.

According to an embodiment, the electronic device 500 may lower a bit rate of a retransmission packet to be transmitted later among the retransmission packets 1117 and transmit the retransmission packet at the lowered bit rate.

The electronic device 500 may set the bit rate (e.g., 192 kbps) of the first level, which is the highest bit rate, as a bit rate at which the main packet 1130 among audio packets to be transmitted to the sink device 700 is to be transmitted in the third transmission interval 1103. The electronic device 500 may set the bit rate (e.g., 128 kbps) of the second level less than the first level, for a first retransmission packet 1131 that is to be first retransmitted among the retransmission packets 1137 to be transmitted later than the main packet 1130 in the third transmission interval 1103, and may set the bit rate (e.g., 88 kbps) of the third level less than the second level, for a second retransmission packet 1133 and a third retransmission packet 1135 among the retransmission packets 1137. The second retransmission packet 1133 may be second transmitted and the third retransmission packet 1135 may be third transmitted, among the retransmission packets 1137.

In an embodiment, different bit rates may be set for the retransmission packets 1137 based on a transmission order of the retransmission packets 1137, and thus it may be possible to increase the packet reception rate of the sink device 700 and the transmission reliability of audio packets.

Figure 12:
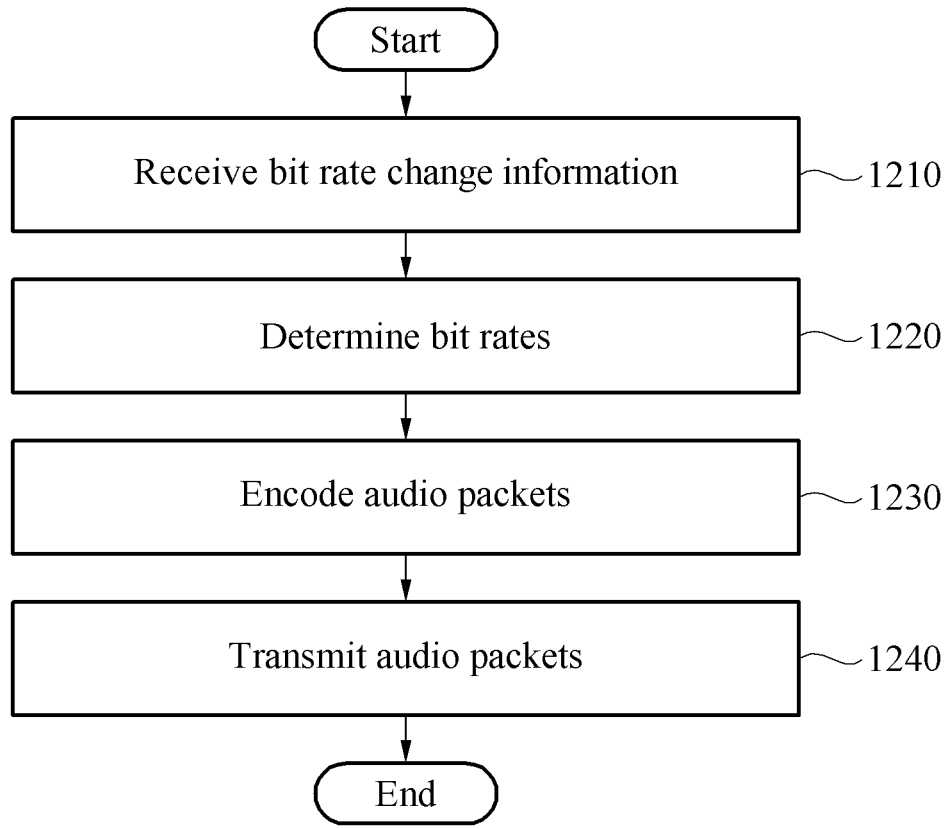
FIG. 12 is a flowchart illustrating another example of a method of operating an electronic device according to an embodiment.

FIG. 12 is a flowchart illustrating another example of a method of operating an electronic device according to an embodiment. In the following embodiments, operations may be performed sequentially, but are not necessarily performed sequentially. For example, the order of the operations may be changed and at least two of the operations may be performed in parallel.

Referring to FIG. 12, an electronic device (e.g., the first electronic device 101 of FIG. 1, the electronic device 500 of FIG. 5, the electronic device 500 of FIG. 6, the electronic device 1601 of FIG. 16, the electronic device 1701 of FIG. 17, and/or the electronic device 1801 of FIG. 18) according to an embodiment may transmit an audio packet with a bit rate changed according to a wireless transmission environment to at least one sink device (e.g., the first electronic device 101 and the second electronic device 102 of FIG. 1, the sink device 700 of FIG. 7, the sink device 700 of FIG. 8, the sink device 1603 of FIG. 16, the sink device 1703 of FIG. 17, and/or the sink device 1803 of FIG. 18), through operations 1210 to 1240.

In operation 1210, the electronic device 500 may receive bit rate change information from the sink device 700. The bit rate change information may correspond to information used to determine a state of the wireless transmission environment based on a reception position of an audio packet successfully received at the sink device 700 and to indicate a bit rate for which the electronic device 500 receives a request to change according to the determined state of the wireless transmission environment. The bit rate change information may be included in, for example, a request signal (e.g., the request signals 1627 and 1647 of FIG. 16, and the request signals 1725 and 1745 of FIG. 17) for requesting to change a bit rate, which is transmitted by the sink device 700 to the electronic device 500.

In operation 1220, the electronic device 500 may variably determine bit rates of audio packets to be transmitted as a bit rate of a level corresponding to the request signal 1627, 1647.

In operation 1230, the electronic device 500 may encode the audio packets by the bit rates determined in operation 1220.

In operation 1240, the electronic device 500 may transmit the audio packets encoded in operation 1230 to the sink device 700.

Figure 13:
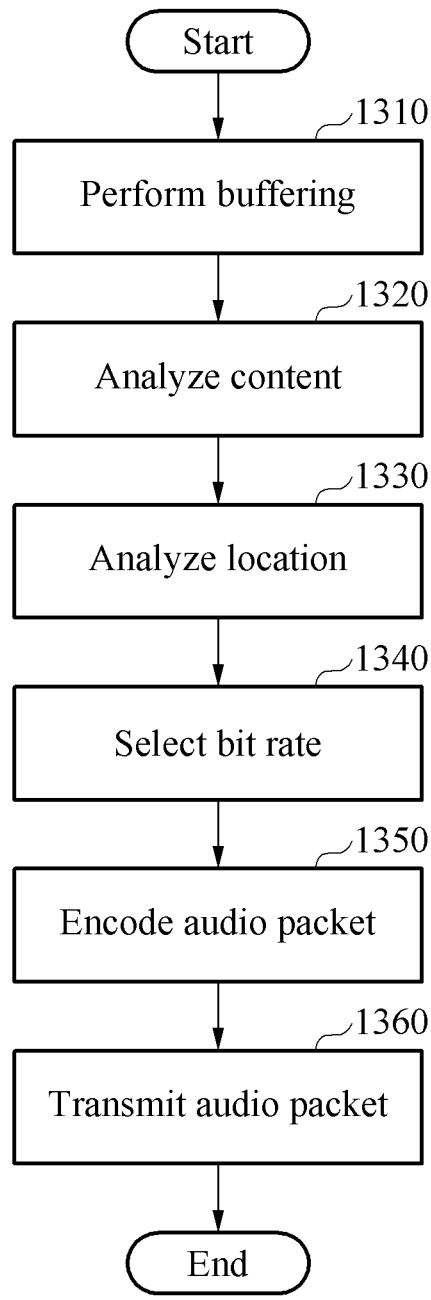
FIG. 13 is a flowchart illustrating a method by which an electronic device sets a bit rate based on a position and a characteristic of content, according to an embodiment.

FIG. 13 is a flowchart illustrating a method by which an electronic device sets a bit rate based on a location and a characteristic of content, according to an embodiment. In the following embodiments, operations may be performed sequentially, but are not necessarily performed sequentially. For example, the order of the operations may be changed and at least two of the operations may be performed in parallel.

Referring to FIG. 13, an electronic device (e.g., the first electronic device 101 of FIG. 1, the electronic device 500 of FIG. 5, the electronic device 500 of FIG. 6, the electronic device 1601 of FIG. 16, the electronic device 1701 of FIG. 17, and/or the electronic device 1801 of FIG. 18) according to an embodiment may adjust a bit rate based on a position and a characteristic of content through operations 1310 to 1360.

In operation 1310, the electronic device 500 may buffer content including an audio packet.

In operation 1320, the electronic device 500 may analyze the content buffered in operation 1310. In an example, when music-based content such as music broadcasting is broadcasted, a sound quality of an audio signal may be important. In another example, when information-based content such as audio guidance and disaster broadcast is broadcasted, an accurate transmission of information may be more important than the sound quality. Accordingly, the electronic device 500 may analyze a characteristic of content that is broadcasted, may set a bit rate of a packet to a high level when the content is content for which a sound quality is important, and may set the bit rate of the packet to a low level when the content is content for which accurate transmission of information is important.

In operation 1330, the electronic device 500 may analyze a packet transmission location, for example, a location in which a broadcasting service is provided. In an example, when a user uses a broadcasting service in a house with a good wireless environment or an outdoor environment in which a large number of repeaters are installed, the electronic device 500 may analyze that a wireless transmission environment of the location in which the broadcasting service is provided is good, and may set a bit rate to be a bit rate of a high level, to maintain a high sound quality. In another example, when a user uses a service in a location in which a small number of repeaters are installed, such as a market, an airport, and/or a subway, or a location in which the number of users is greater than the number of installed repeaters, the electronic device 500 may analyze that a wireless transmission environment of the location in which a broadcasting service is provided is poor, and may set a bit rate to be a bit rate of a low level, to reduce an occurrence of sound interruption.

Accordingly, the electronic device 500 may analyze location information of a broadcasting device that provides a broadcasting service, set a high bit rate of a packet in a location with a good wireless transmission environment, and set a low bit rate of a packet in a location with a poor wireless transmission environment. The location information of the broadcasting device may be analyzed based on, for example, a location in which the broadcasting device is installed or global positioning system (GPS) information of a device including the broadcasting device.

In an embodiment, operations 1320 and 1330 may be performed at the same time or performed at a predetermined interval. Also, operations 1320 and 1330 may be performed in a different order from the order described above.

In operation 1340, the electronic device 500 may select a bit rate based on a content analysis result obtained in operation 1320 and/or an analysis result obtained by analyzing the location in which the broadcasting service is provided in operation 1330.

In operation 1350, the electronic device 500 may encode an audio packet at the bit rate selected in operation 1340.

In operation 1360, the electronic device 500 may transmit the audio packet encoded in operation 1350.

Figure 14:
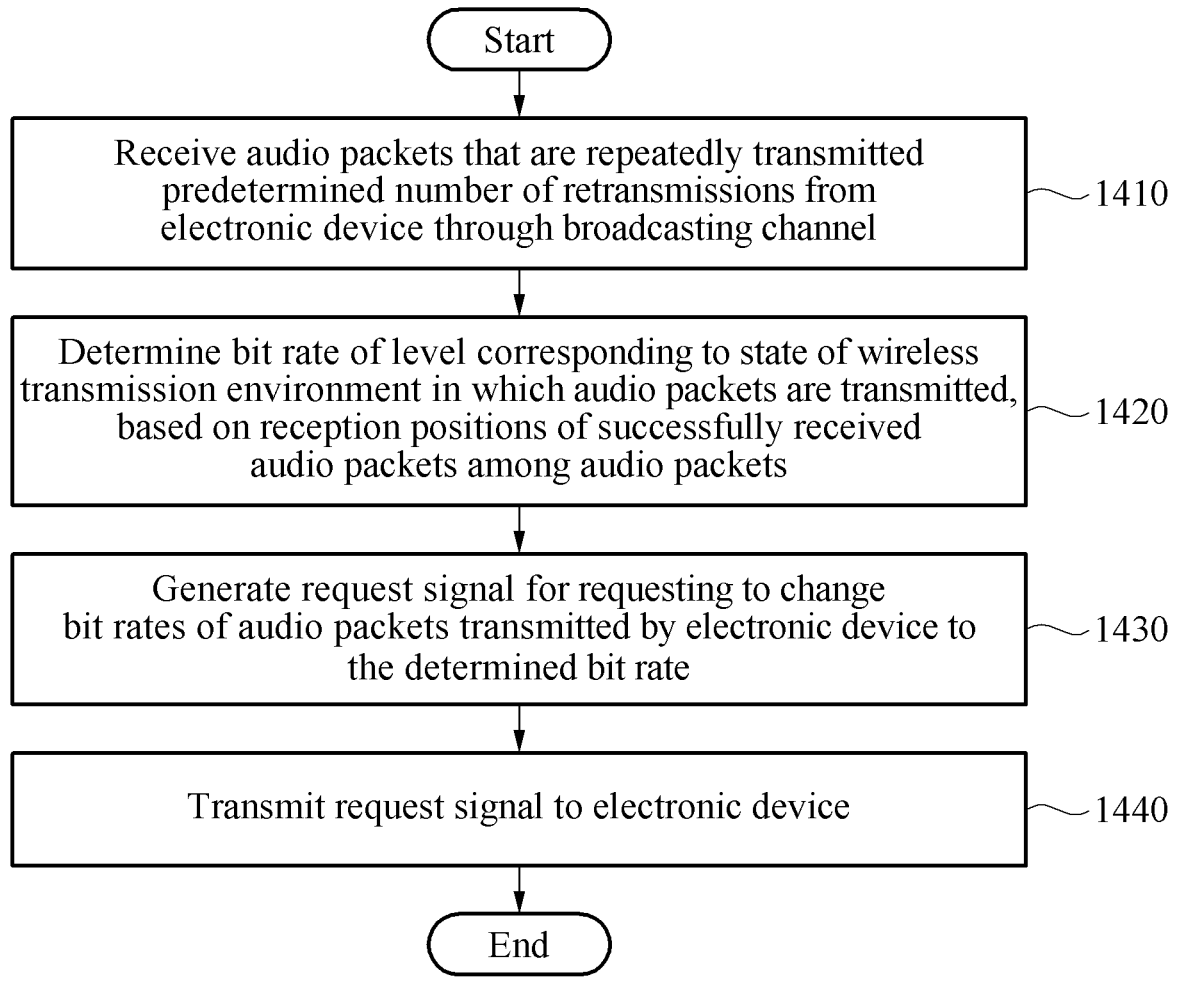
FIG. 14 is a flowchart illustrating an example of a method of operating a sink device according to an embodiment.

FIG. 14 is a flowchart illustrating an example of a method of operating a sink device according to an embodiment. In the following embodiments, operations may be performed sequentially, but are not necessarily performed sequentially.

For example, the order of the operations may be changed and at least two of the operations may be performed in parallel.

Referring to FIG. 14, a sink device (e.g., the first electronic device 101 and the second electronic device 102 of FIG. 1, the sink device 700 of FIG. 7, the sink device 700 of FIG. 8, the sink device 1603 of FIG. 16, the sink device 1703 of FIG. 17, and/or the sink device 1803 of FIG. 18) according to an embodiment may generate a request signal (e.g., the request signals 1627 and 1647 of FIG. 16, and the request signals 1725 and 1745 of FIG. 17) for requesting to change a bit rate and may transmit the request signal to an electronic device (e.g., the first electronic device 101 of FIG. 1, the electronic device 500 of FIG. 5, the electronic device 500 of FIG. 6, the electronic device 1601 of FIG. 16, the electronic device 1701 of FIG. 17, and/or the electronic device 1801 of FIG. 18) through operations 1410 to 1440.

In operation 1410, the sink device 700 may receive audio packets which are repeatedly transmitted a predetermined number of retransmissions (e.g., a predetermined number of times) by the electronic device 500 through a broadcasting channel.

In operation 1420, the sink device 700 may determine a bit rate of a level corresponding to a state of a wireless transmission environment in which audio packets are transmitted, based on a reception position of a successfully received audio packet among the audio packets received in operation 1410.

In an example, when a successfully received audio packet among audio packets received by the sink device 700 is a main packet that is first transmitted, the sink device 700 may determine that the state of the wireless transmission environment is good. For example, the sink device 700 may determine a bit rate corresponding to the state (e.g., "good") of the wireless transmission environment to be a bit rate (e.g., 192 kbps) of a first level. In another example, when the successfully received audio packet is a retransmission packet that is transmitted later than the main packet, and when the retransmission packet is a first retransmission packet that is second transmitted or a second retransmission packet that is third transmitted, the sink device 700 may determine that the wireless transmission environment is in a normal state. The sink device 700 may determine a bit rate corresponding to the state (e.g., "normal") of the wireless transmission environment to be a bit rate (e.g., 128 kbps) of a second level. In another example, when the successfully received audio packet is a retransmission packet and when the retransmission packet is a third retransmission packet that is fourth transmitted, the sink device 700 may determine that the state of the wireless transmission environment is poor. The sink device 700 may determine a bit rate corresponding to the state (e.g., "poor") of the wireless transmission environment to be a bit rate (e.g., 88 kbps) of a third level.

In operation 1430, the sink device 700 may generate the request signal 1627, 1647 for requesting to change bit rates of audio packets transmitted by the electronic device 500 to the bit rate of the level determined in operation 1420.

In operation 1440, the sink device 700 may transmit the request signal 1627, 1647 generated in operation 1430 to the electronic device 500.

Figure 15:
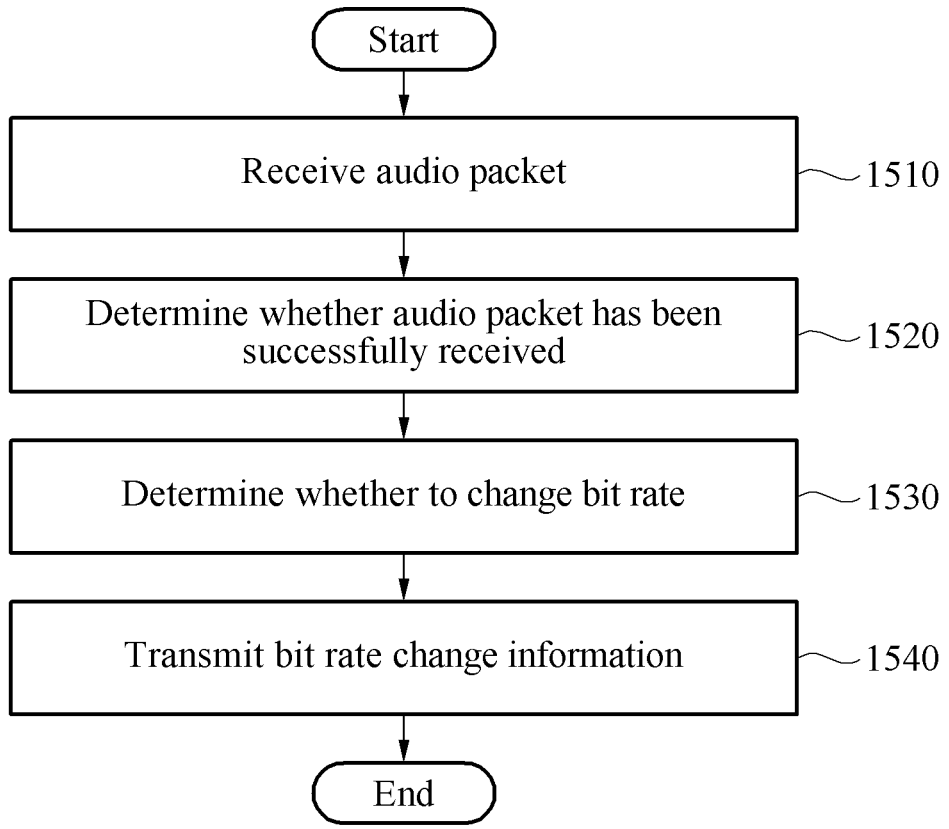
FIG. 15 is a flowchart illustrating another example of a method of operating a sink device according to an embodiment.

FIG. 15 is a flowchart illustrating another example of a method of operating a sink device according to an embodiment. In the following embodiments, operations may be performed sequentially, but are not necessarily performed sequentially. For example, the order of the operations may be changed and at least two of the operations may be performed in parallel.

Referring to FIG. 15, a sink device (e.g., the first electronic device 101 and the second electronic device 102 of FIG. 1, the sink device 700 of FIG. 7, the sink device 700 of FIG. 8, the sink device 1603 of FIG. 16, the sink device 1703 of FIG. 17, and/or the sink device 1803 of FIG. 18) according to an embodiment may generate a request signal (e.g., the request signals 1627 and 1647 of FIG. 16, and the request signals 1725 and 1745 of FIG. 17) for requesting to change a bit rate and may transmit the request signal to an electronic device (e.g., the first electronic device 101 of FIG. 1, the electronic device 500 of FIG. 5, the electronic device 500 of FIG. 6, the electronic device 1601 of FIG. 16, the electronic device 1701 of FIG. 17, and/or the electronic device 1801 of FIG. 18) through operations 1510 to 1540.

In operation 1510, the sink device 700 may receive an audio packet that is broadcasted. For example, audio packets may be transmitted at regular transmission intervals, and the same packet may be repeatedly transmitted multiple times.

In operation 1520, the sink device 700 may determine whether the audio packet has been successfully received in operation 1510. For example, when a main packet (e.g., the main packets 1110 and 1130) among the audio packets is successfully received first, the sink device 700 may determine that a wireless transmission environment is good. In another example, when the main packet is not received and one of the retransmission packets 1117 and 1137 transmitted later than the main packets 1110 and 1130 among the audio packets is received, the sink device 700 may determine that the wireless transmission environment is poor. In this example, the sink device 700 may determine that the wireless transmission environment deteriorates when receiving a retransmission packet that is transmitted later among the plurality of retransmission packets 1117 and 1137.

In operation 1530, the sink device 700 may determine a state of the wireless transmission environment based on a position of the audio packet successfully received in operation 1520, and may determine whether to change a bit rate, for example, whether to send a request to change a level of a bit rate of an audio packet to be transmitted by the electronic device 500. The state of the wireless transmission environment may be determined based on a position of a packet successfully received by the sink device 700.

In an example, when the successfully received audio packet is the main packet 1110, 1130 in operation 1520, the sink device 700 may determine a bit rate to be requested to be changed in operation 1530 as a bit rate of a first level. In another example, when the successfully received audio packet is a retransmission packet that is transmitted later than the main packet and when the retransmission packet is a first retransmission packet that is first transmitted among retransmission packets in operation 1520, the sink device 700 may determine the bit rate to be requested to be changed in operation 1530 as a bit rate of a second level.

In operation 1540, the sink device 700 may transmit the request signal 1627, 1647 including bit rate change information to change to the bit rate determined in operation 1530 to the electronic device 500.

FIG. 16 is a diagram illustrating an example of a method of transmitting and receiving a packet between an electronic device and a sink device according to an embodiment. In an example of FIG. 16, packets may be transmitted and received between the electronic device 1601 (e.g., the first electronic device 101 of FIG. 1, the electronic device 500 of FIG. 5, the electronic device 500 of FIG. 6, the electronic device 1701 of FIG. 17, and/or the electronic device 1801 of FIG. 18) and the sink device 1603 (e.g., the first electronic device 101 and the second electronic device 102 of FIG. 1, the sink device 700 of FIG. 7, the sink device 700 of FIG. 8, the sink device 1703 of FIG. 17, and/or the sink device 1803 of FIG. 18) according to an embodiment based on a wireless transmission environment.

The electronic device 1601 may sequentially transmit audio packets at regular transmission intervals (e.g., an ISO_Interval).

In an embodiment, the electronic device 1601 may transmit the main packet 1611 that is to be first transmitted and the retransmission packets 1615 in the first transmission interval 1610 at a bit rate (e.g., 192 kbps) of a first level. If the sink device 1603 successfully receives the main packet 1611 that is first transmitted in the first transmission interval 1610, the sink device 1603 may determine that the wireless transmission environment is good and may not make a request to change a bit rate. Accordingly, similarly to the first transmission period 1610, in the second transmission interval 1620, the electronic device 1601 may transmit the main packet 1621 that is to be first transmitted and the retransmission packets 1625 at the bit rate (e.g., 192 kbps) of the first level.

In an embodiment, if the sink device 1603 does not successfully receive the main packet 1621 and successfully receives a first retransmission packet 1622 among the retransmission packets 1625 in the second transmission interval 1620, the sink device 1603 may determine that the wireless transmission environment deteriorates, and may transmit the request signal 1627 for requesting to change a bit rate of an audio packet to a bit rate (e.g., 128 kbps) of a second level to the electronic device 1601.

In an embodiment, if the request signal 1627 is received, the electronic device 1601 may change a bit rate of an audio packet to be transmitted in the third transmission interval 1630. The electronic device 1601 may transmit to the sink device 1603 the main packet 1631 that is to be first transmitted and the retransmission packets 1635 that are to be transmitted later than the main packet 1631 in the third transmission interval 1630 at the bit rate (e.g., 128 kbps) of the second level.

In an embodiment, if the sink device 1603 successfully receives the main packet 1631 among audio packets transmitted in the third transmission interval 1630, the sink device 1603 may determine that the wireless transmission environment does not further deteriorate, and may not make a request to change a bit rate. Accordingly, similarly to the third transmission interval 1630, in the fourth transmission interval 1640, the electronic device 1601 may transmit the main packet 1641 that is to be first transmitted and the retransmission packets 1645 at the bit rate (e.g., 128 kbps) of the second level.

In an embodiment, if the sink device 1603 does not successfully receive the main packet 1641, a first retransmission packet and a second retransmission packet, and successfully receives a third retransmission packet 1644 among the retransmission packets 1645 in the fourth transmission interval 1640, the sink device 1603 may determine that the wireless transmission environment deteriorates, and may transmit the request signal 1647 for requesting to change a bit rate of an audio packet to a bit rate (e.g., 88 kbps) of a third level to the electronic device 1601.

In an embodiment, if the request signal 1647 is received, the electronic device 1601 may change bit rates of audio packets to be transmitted in the fifth transmission interval 1650. The electronic device 1601 may transmit the main packet 1651 that is to be first transmitted and the retransmission packets 1655 that are to be transmitted later than the main packet 1651 in the fifth transmission interval 1650 at the bit rate (e.g., 88 kbps) of the third level.

FIG. 17 is a diagram illustrating another example of a method of transmitting and receiving a packet between an electronic device and a sink device according to an embodiment. In an example 1700 of FIG. 17, packets may be transmitted and received between the electronic device 1701 (e.g., the first electronic device 101 of FIG. 1, the electronic device 500 of FIG. 5, the electronic device 500 of FIG. 6, the electronic device 1601 of FIG. 16, and/or the electronic device 1801 of FIG. 18) and the sink device 1703 (e.g., the first electronic device 101 and the second electronic device 102 of FIG. 1, the sink device 700 of FIG. 7, the sink device 700 of FIG. 8, the sink device 1603 of FIG. 16, and/or the sink device 1803 of FIG. 18) according to an embodiment, based on a wireless transmission environment together with a type of audio packets.

The electronic device 1701 may set a bit rate of each of a main packet and a retransmission packet based on a set bit rate and may transmit audio packets.

For example, the electronic device 1701 may set a bit rate of the main packet to a bit rate (e.g., 192 kbps) of a first level, set a bit rate of each of a first retransmission packet and a second retransmission packet that are to be first and second retransmitted, respectively, to a bit rate (e.g., 128 kbps) of a second level, and may set a bit rate of a third retransmission packet that is to be third, that is, last retransmitted to a bit rate (e.g., 88 kbps) of a third level.

Accordingly, the electronic device 1701 may transmit the main packet 1711 at the bit rate (e.g., 192 kbps) of the first level, may transmit the first retransmission packet 1712 and the second retransmission packet 1713 at the bit rate (e.g., 128 kbps) of the second level, and may transmit the third retransmission packet 1714 at the bit rate (e.g., 88 kbps) of the third level in the first transmission interval 1710.

If the sink device 1703 successfully receives the main packet 1711 that is first transmitted in the first transmission interval 1710, the sink device 1703 may determine that the wireless transmission environment is good and may not make a request to change a bit rate. Accordingly, the electronic device 1701 may transmit audio packets at the same bit rates as in the first transmission interval 1710 in the second transmission interval 1720.

For example, when the sink device 1703 does not successfully receive the main packet and the first retransmission packet and successfully receives the second retransmission packet 1723 in the second transmission interval 1720, the sink device 1703 may determine that the wireless transmission environment deteriorates and may transmit the request signal 1725 for requesting to change a bit rate to the electronic device 1701.

In an embodiment, the electronic device 1701 may adjust a bit rate of an audio packet in the third transmission interval 1730 in response to the request signal 1725. In the third transmission interval 1730, the electronic device 1701 may change a bit rate of the main packet 1731 from the bit rate (e.g., 192 kbps) of the first level to the bit rate (e.g., 128 kbps) of the second level, may change bit rates of the retransmission packets 1732, and 1733 to the bit rate (e.g., 88 kbps) of the third level, and may transmit the main packet 1731 and the retransmission packets 1732, 1733, and 1734.

In an embodiment, when the sink device 1703 successfully receives the main packet 1731 in the third transmission interval 1730, the sink device 1703 may not make a request to change a bit rate. Accordingly, the electronic device 1701 may transmit audio packets at the same bit rates as in the third transmission interval 1730 in the fourth transmission interval 1740.

If the sink device 1703 does not successfully receive the main packet, the first retransmission packet, and the second retransmission packer, and successfully receives the third retransmission packet 1744 in the fourth transmission interval 1740, the sink device 1703 may determine that the wireless transmission environment further deteriorates and may additionally transmit the request signal 1745 for requesting to change a bit rate.

If the request signal 1745 is received, the electronic device 1701 may change a bit rate of the main packet 1751 and bit rates of the retransmission packets 1752, and 1753 in the fifth transmission interval 1750 to the bit rate (e.g., 88 kbps) of the third level in response to a request to change a bit rate, and may transmit the main packet 1751 and the retransmission packets 1752, 1753, and 1754.

In an embodiment, by various combining the above four scenarios, it may be possible to flexibly cope with a situation change including a change in a wireless transmission environment, thereby increasing a transmission rate and guaranteeing a robustness against sound interruption.

FIG. 18 is a diagram illustrating another example of a method of transmitting and receiving a packet between an electronic device and a sink device according to an embodiment. In an example of FIG. 18, packets may be transmitted and received between the electronic device 1801 (e.g., the first electronic device 101 of FIG. 1, the electronic device 500 of FIG. 5, the electronic device 500 of FIG. 6, and/or the electronic device 1701 of FIG. 17) and the sink device 1803 (e.g., the first electronic device 101 and the second electronic device 102 of FIG. 1, the sink device 700 of FIG. 7, the sink device 700 of FIG. 8, and/or the sink device 1703 of FIG. 17) according to an embodiment, based on a wireless transmission environment. In this example, since the wireless transmission environment is poor, the packets may be transmitted at a bit rate of a lowest level.

For example, when the wireless transmission environment between the electronic device 1801 and the sink device 1803 is poor, a bit rate of a main packet may be set to a bit rate (e.g., 128 kbps) of a second level, and bit rates of all retransmission packets 1815 that are to be retransmitted in a retransmission interval may be set to a bit rate (e.g., 88 kbps) of a third level, as in the first transmission interval 1810. In this example, if the sink device 1803 does not successfully receive the main packet and successfully receives a first retransmission packet among the retransmission packets 1815 retransmitted in the retransmission interval of the first transmission interval 1810, the sink device 1703 may determine that the wireless transmission environment is normal, and may not make a request to change a bit rate. Accordingly, the electronic device 1801 may transmit audio packets at the same bit rates as in the first transmission interval 1810 in the second transmission interval 1820. For example, in the second transmission interval 1820, the main packet 1821 may be transmitted at a bit rate (e.g., 128 kbps) of a second level, and all the retransmission packets 1825 in the second retransmission interval may be transmitted at the bit rate (e.g., 88 kbps) of the third level.

For example, when the sink device 1803 successfully receives the main packet 1821 that is first transmitted in the second transmission interval 1820, the sink device 1803 may determine that the wireless transmission environment is improved and may transmit the request signal 1827 for requesting to change a bit rate to the electronic device 1801.

The electronic device 1801 may adjust a bit rate of an audio packet in the third transmission interval 1830 in response to the request signal 1827. In the third transmission interval 1830, the electronic device 1801 may change a bit rate of the main packet 1831 from the bit rate (e.g., 128 kbps) of the second level to the bit rate (e.g., 192 kbps) of the first level, may change a bit rate of each of a first retransmission packet and a second retransmission packet among the retransmission packets 1835 to be retransmitted in a retransmission interval to the bit rate of the second level, may maintain a bit rate of a third retransmission packet to be the bit rate (e.g., 88 kbps) of the third level, and may transmit the main packet 1831 and the first through third retransmission packets.

In an embodiment, when the sink device 1803 successfully receives the main packet 1831 that is first transmitted in the third transmission interval 1830, audio packets may be transmitted at the same bit rates as in the third transmission interval 1830 in a fourth transmission interval (not shown).

According to an embodiment, an electronic device 101, 500, 1601, 1701, 1801 may include a memory 130, 510, a processor 120, 530, and a communication interface 190, 550 configured to transmit audio packets to at least one sink device 101, 102, 700, 1603, 1703, 1803. The processor 120, 530 may be configured to determine bit rates of the audio packets based on at least one of a wireless transmission environment in which the audio packets are transmitted, and a type of each of the audio packets transmitted to the at least one sink device 101, 102, 700, 1603, 1703, 1803, encode a broadcasting audio signal to audio packets based on the bit rates, and repeatedly transmit the audio packets a predetermined number of retransmissions to the at least one sink device 101, 102, 700, 1603, 1703, 1803 through a broadcasting channel.

According to an embodiment, the processor 120, 530 may be configured to allocate bit rates of different predetermined levels based on whether a type of each of the audio packets is a main packet 1110, 1130, 1611, 1621, 1631, 1641, 1651, 1711, 1731, 1751, 1811, 1821, 1831, which is to be transmitted first among the repeatedly transmitted audio packets, or is a retransmission packet, which is to be transmitted later than the main packet, and based on an ordinal position or an order of the retransmission packet among retransmission packets.

According to an embodiment, the processor 120, 530 may be configured to allocate a bit rate of a first level to the main packet 1110, 1130, 1611, 1621, 1631, 1641, 1651, 1711, 1731, 1751, 1811, 1821, 1831, when a type of a corresponding audio packet is the main packet 1110, 1130, 1611, 1621, 1631, 1641, 1651, 1711, 1731, 1751, 1811, 1821, 1831, and allocate a bit rate of one of a plurality of levels less than the first level based on the ordinal position or the order of the retransmission packet among the retransmission packets, when the type of the corresponding audio packet is the retransmission packet.

According to an embodiment, the processor 120, 530 may be configured to variably adjust the bit rates based on a congestion level of the wireless transmission environment.

According to an embodiment, the communication interface 190, 550 may be configured to transmit a request signal 1627, 1647, 1725, 1745, 1827 for requesting a change of the bit rates from the at least one sink device 101, 102, 700, 1603, 1703, 1803. The request signal 1627, 1647, 1725, 1745, 1827 may be based on a state of the wireless transmission environment determined by a reception position of an audio packet successfully received at the at least one sink device 101, 102, 700, 1603, 1703, 1803. The processor 120, 530 may be configured to change the bit rates of the audio packets to a bit rate of a level corresponding to the request signal 1627, 1647, 1725, 1745, 1827.

According to an embodiment, the processor 120, 530 may be configured to define bit rates of a plurality of levels for each of steps corresponding to the wireless transmission environment, allocate bit rates of different predetermined levels for a type of each of the repeatedly transmitted audio packets, and adjust the bit rates of the audio packets to a bit rate of a level less than the different levels of the allocated bit rates, in response to a request signal 1627, 1647, 1725, 1745, 1827 for requesting to change the bit rates being received from the at least one sink device 101, 102, 700, 1603, 1703, 1803 through the communication interface 190, 550. The request signal 1627, 1647, 1725, 1745, 1827 may be based on a state of the wireless transmission environment determined by a reception position of an audio packet successfully received at the at least one sink device 101, 102, 700, 1603, 1703, 1803.

According to an embodiment, the processor 120, 530 may be configured to adjust the bit rates, further based on at least one of a content characteristic of a broadcasting audio signal transmitted through the audio packets and a location in which a broadcasting service for the audio packets is provided.

According to an embodiment, the processor 120, 530 may be configured to analyze whether a characteristic of the broadcasting audio signal corresponds to a first characteristic that a sound quality is prioritized over an information transmission or a second characteristic that the information transmission is prioritized over the sound quality, and based on a result of the analyzing, determine the bit rates to be a bit rate of a first level, when the characteristic of the broadcasting audio signal corresponds to the first characteristic, and determine the bit rates to be a bit rate of a second level less than the first level, when the characteristic of the broadcasting audio signal corresponds to the second characteristic.

According to an embodiment, the processor 120, 530 may be configured to analyze location information of a device that provides the broadcasting service for the audio packets, and adjust the bit rates for each of steps of a preset wireless transmission environment, in response to the location information.

According to an embodiment, a sink device 101, 102, 700, 1603, 1703, 1803 may include a memory 130, 710, a processor 120, 730, and a communication interface 190, 750 configured to receive audio packets which are repeatedly transmitted a predetermined number of retransmissions by an electronic device 101, 500, 1601, 1701, 1801 through a broadcasting channel. The processor 120, 730 may be configured to determine a bit rate of a level corresponding to a state of a wireless transmission environment in which an audio packet is transmitted, based on a reception position of the audio packet, the audio packet being successfully received among the audio packets, generate a request signal 1627, 1647, 1725, 1745, 1827 for requesting to change bit rates of audio packets to be transmitted by the first electronic device 101, 500, 1601, 1701, 1801 to the determined bit rate, and transmit the request signal 1627, 1647, 1725, 1745, 1827 to the first electronic device 101, 500, 1601, 1701, 1801.

According to an embodiment, the processor 120, 730 may be configured to determine the bit rate to be a bit rate of a first level, when the successfully received audio packet is a main packet 1110, 1130, 1611, 1621, 1631, 1641, 1651, 1711, 1731, 1751, 1811, 1821, 1831 that is first received, and determine the bit rate to be a bit rate of one of a plurality of levels less than the first level based on a reception position of a retransmission packet 1117, 1137, 1615, 1635, 1645, 1655, 1712, 1713, 1714, 1723, 1732, 1733, 1734, 1744, 1752, 1753, 1754, 1815, 1825, 1835, which is transmitted later than the main packet, when the successfully received audio packet is the retransmission packet 1117, 1137, 1615, 1635, 1645, 1655, 1712, 1713, 1714, 1723, 1732, 1733, 1734, 1744, 1752, 1753, 1754, 1815, 1825, 1835.

According to an embodiment, the processor 120, 730 may be configured to transmit information on the determined bit rate together with the request signal 1627, 1647, 1725, 1745, 1827 to the first electronic device 101, 500, 1601, 1701, 1801.

According to an embodiment, the information on the determined bit rate may include a bit rate of a level corresponding to a state of the wireless transmission environment determined by reception positions of the audio packets.

According to an embodiment, the communication interface 190, 750 may be configured to generate a communication link for transmitting the request signal 1627, 1647, 1725, 1745, 1827, and transmit the request signal 1627, 1647, 1725, 1745, 1827 to the first electronic device 101, 500, 1601, 1701, 1801 through the communication link.

According to an embodiment, the processor 120, 730 may be configured to decode and output the audio packets.

According to an embodiment, a method of operating an electronic device 101, 500, 1601, 1701, 1801 may include operation 910 of determining bit rates of audio packets based on at least one of a wireless transmission environment in which the audio packets are transmitted, and a type of each of the audio packets transmitted to the at least one sink device 101, 102, 700, 1603, 1703, 1803, operation 920 of encoding a broadcasting audio signal to the audio packets based on the bit rates, and operation 930 of repeatedly transmitting the audio packets a predetermined number of retransmissions to the at least one sink device 101, 102, 700, 1603, 1703, 1803 through a broadcasting channel.

According to an embodiment, the determining of the bit rates may include allocating bit rates of different predetermined levels based on whether a type of each of the audio packets is a main packet 1110, 1130, 1611, 1621, 1631, 1641, 1651, 1711, 1731, 1751, 1811, 1821, 1831, which is to be transmitted first among the repeatedly transmitted audio packets, or is a retransmission packet 1117, 1137, 1615, 1635, 1645, 1655, 1712, 1713, 1714, 1723, 1732, 1733, 1734, 1744, 1752, 1753, 1754, 1815, 1825, 1835, which is to be transmitted later than the main packet, and based on an ordinal position or an order of the retransmission packet among retransmission packets.

According to an embodiment, the method of operating an electronic device 101, 500, 1601, 1701, 1801 may further include receiving a request signal 1627, 1647, 1725, 1745, 1827 for requesting to change the bit rates from the at least one sink device 101, 102, 700, 1603, 1703, 1803, the request signal 1627, 1647, 1725, 1745, 1827 being based on a state of the wireless transmission environment determined by a reception position of an audio packet successfully received at the at least one sink device 101, 102, 700, 1603, 1703, 1803, and variably changing the bit rates of the audio packets to a bit rate of a level corresponding to the request signal 1627, 1647, 1725, 1745, 1827.

According to an embodiment, a method of operation a sink device 101, 102, 700, 1603, 1703, 1803 may include operation of 1410 of receiving audio packets which are repeatedly transmitted a predetermined number of retransmissions by an electronic device 101, 500, 1601, 1701, 1801 through a broadcasting channel, operation 1420 of determining a bit rate of a level corresponding to a state of a wireless transmission environment in which the audio packets are transmitted, based on reception positions of successfully received audio packets among the audio packets, operation 1430 of generating a request signal 1627, 1647, 1725, 1745, 1827 for requesting to change bit rates of audio packets to be transmitted by the first electronic device 101, 500, 1601, 1701, 1801 to the determined bit rate, and operation 1440 of transmitting the request signal 1627, 1647, 1725, 1745, 1827 to the first electronic device 101, 500, 1601, 1701, 1801.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
a memory;
a processor; and
a communication interface configured to transmit audio packets to at least one sink device,
wherein the processor is configured to:
determine bit rates of the audio packets based on a type of each of the audio packets, wherein the audio packets include a main packet and retransmission packets;
encode the audio packets including the main packet and the retransmission packets based on the bit rates of the audio packets; and
repeatedly transmit the audio packets including the main packet and the retransmission packets a predetermined number of times to the at least one sink device through a broadcasting channel,
wherein the processor is further configured to allocate a bit rate of a plurality of different bit rates to an audio packet of the audio packets based on a type of the audio packet, the type of the audio packet being the main packet among the audio packets or a retransmission packet of the retransmission packets among the audio packets, wherein the main packet is a packet which is to be transmitted first among the audio packets and the retransmission packet is a packet of the retransmission packets which is to be transmitted later than the main packet among the audio packets.

2. The electronic device of claim 1, wherein the processor is configured to:
allocate a first bit rate of the plurality of different bit rates to the audio packet of the audio packets based on the audio packet being the main packet; and
allocate a second bit rate of the plurality of different bit rates less than the first bit rate to the audio packet of the audio packets based on the audio packet being the retransmission packet and an order of the retransmission packet among the retransmission packets.

3. The electronic device of claim 1, wherein the processor is configured to variably adjust the bit rates of the audio packets based on a congestion level of the wireless transmission environment.

4. The electronic device of claim 1, wherein the communication interface is configured to receive a request signal for requesting to change the bit rates of the audio packets from the at least one sink device, the request signal being based on a state of a wireless transmission environment determined by a reception position of a retransmission packet first successfully received at the at least one sink device among the retransmission packets of the audio packets transmitted from the electronic device, and
wherein the processor is configured to change the bit rates of the audio packets to a bit rate of the plurality of different bit rates corresponding to the request signal.

5. The electronic device of claim 1, wherein the processor is configured to:
define the plurality of different bit rates based on a wireless transmission environment in which the audio packets are transmitted from the electronic device;
allocate a bit rate of the plurality of different bit rates for a type of each of the repeatedly transmitted audio packets; and
adjust the bit rates of the audio packets to a bit rate of the plurality of different bit rates less than the allocated bit rate in response to a request signal for requesting to change the bit rates being received from the at least one sink device through the communication interface, the request signal being based on a state of the wireless transmission environment determined by a reception position of an audio packet successfully received at the at least one sink device.

6. The electronic device of claim 1, wherein the processor is configured to adjust the bit rates of the audio packets further based on at least one of a content characteristic of a broadcasting audio signal transmitted through the audio packets and a location in which a broadcasting service for the audio packets is provided.

7. The electronic device of claim 6, wherein the processor is configured to:
analyze whether a characteristic of the broadcasting audio signal corresponds to a first characteristic that a sound quality is prioritized over an information transmission or a second characteristic that the information transmission is prioritized over the sound quality; and
determine the bit rates of the audio packets to be a first bit rate of the plurality of different bit rates based on the characteristic of the broadcasting audio signal corresponding to the first characteristic, and determine the bit rates of the audio packets to be a second bit rate of the plurality of different bit rates less than the first bit rate based on the characteristic of the broadcasting audio signal corresponding to the second characteristic.

8. The electronic device of claim 6, wherein the processor is configured to:
analyze location information of a device that provides a broadcasting service for the audio packets; and
adjust the bit rates of the audio packets in response to the location information.

9. A sink device comprising:
a memory;
a processor; and
a communication interface configured to receive audio packets including a main packet and retransmission packets from an electronic device, the audio packets including the main packet and the retransmission packets being repeatedly transmitted a predetermined number of times by the electronic device through a broadcasting channel, wherein the main packet is a packet first transmitted among the audio packets and each of the retransmission packets is a packet transmitted later than the main packet among the audio packets,
wherein the processor is configured to:
determine a bit rate of a plurality of different bit rates corresponding to a state of a wireless transmission environment in which the audio packets are transmitted based on a reception position of a retransmission packet first successfully received by the sink device among the retransmission packets of the audio packets;

generate a request signal for requesting to change bit rates of the audio packets to the determined bit rate; and transmit the request signal to the electronic device, wherein the processor is further configured to determine the bit rate of the plurality of different bit rates based on a type of the successfully received audio packet, the type of the successfully received audio packet being the main packet or the first successfully received retransmission packet.

10. The sink device of claim 9, wherein the processor is configured to:

determine the bit rate to be a first bit rate of the plurality of different bit rates based on the successfully received audio packet being the main packet that is first transmitted among the audio packets; and determine the bit rate to be a second bit rate of the plurality of different bit rates less than the first bit rate based on a reception position of the retransmission packet which is transmitted later than the main packet among the audio packets based on the successfully received audio packet being the retransmission packet.

11. The sink device of claim 9, wherein the processor is configured to transmit information on the determined bit rate together with the request signal to the electronic device.

12. The sink device of claim 11, wherein the information on the determined bit rate comprises a bit rate of the plurality of different bit rates corresponding to the state of the wireless transmission environment determined by the reception position of the successfully received audio packet among the audio packets.

13. The sink device of claim 9, wherein the communication interface is configured to:

generate a communication link for transmitting the request signal; and transmit the request signal to the electronic device through the communication link.

14. The sink device of claim 9, wherein the processor is configured to decode and output the audio packets.

15. A method of operating an electronic device, the method comprising:

determining bit rates of audio packets based on a type of each of the audio packets, wherein the audio packets include a main packet and retransmission packets;

encoding the audio packets including the main packet and the retransmission packets based on the bit rates of the audio packets; and repeatedly transmitting the audio packets including the main packet and the retransmission packets a predetermined number of times to at least one sink device through a broadcasting channel, wherein the determining of the bit rates comprises allocating a bit rate of a plurality of different bit rates to an audio packet of the audio packets based on a type of the audio packet, the type of the audio packet being the main packet among the audio packets or a retransmission packet of the retransmission packets among the audio packets, wherein the main packet is a packet which is to be transmitted first among the audio packets and the retransmission packet is a packet of the retransmission packets which is to be transmitted later than the main packet among the audio packets.

16. The method of claim 15, further comprising:

receiving a request signal for requesting to change the bit rates of the audio packets from the at least one sink device, the request signal being based on a state of a wireless transmission environment determined by a reception position of a retransmission packet first successfully received at the at least one sink device among the retransmission packets of the audio packets transmitted from the electronic device; and variably changing the bit rates of the audio packets to a bit rate of a plurality of different bit rates corresponding to the request signal.

17. A non-transitory computer-readable storage medium storing instructions that, when executed by a processor, cause the processor to perform the method of claim 15.

18. A method of operating a sink device, the method comprising:

receiving audio packets including a main packet and retransmission packets from an electronic device, the audio packets including the main packet and the retransmission packets being repeatedly transmitted a predetermined number of times by the electronic device through a broadcasting channel, wherein the main packet is a packet first transmitted among the audio packets and each of the retransmission packets is a packet transmitted later than the main packet among the audio packets;

determining a bit rate of a plurality of different bit rates corresponding to a state of a wireless transmission environment in which the audio packets are transmitted based on a reception position of a retransmission packet first successfully received by the sink device among the retransmission packets of the audio packets;

generating a request signal for requesting to change the bit rates of the audio packets to the determined bit rate; and transmitting the request signal to the electronic device, wherein the determining of the bit rate of the plurality of different bit rates comprises determining the bit rate of the plurality of different bit rates based on a type of the successfully received audio packet, the type of the successfully received audio packet being the main packet or the first successfully received retransmission packet.

* * * * *